(12) United States Patent
Yajima et al.

(10) Patent No.: US 12,447,730 B2
(45) Date of Patent: Oct. 21, 2025

(54) METHOD OF MANUFACTURING SOUNDPROOF SHEET AND SOUNDPROOF SHEET

(71) Applicant: SEIKO EPSON CORPORATION, Tokyo (JP)

(72) Inventors: Hideaki Yajima, Nagano (JP); Yuta Okawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 18/456,547

(22) Filed: Aug. 28, 2023

(65) Prior Publication Data

US 2024/0066855 A1 Feb. 29, 2024

(30) Foreign Application Priority Data

Aug. 29, 2022 (JP) ................. 2022-135664

(51) Int. Cl.
 *B32B 38/08* (2006.01)
 *B32B 5/02* (2006.01)
 (Continued)

(52) U.S. Cl.
 CPC ............... *B32B 38/08* (2013.01); *B32B 5/02* (2013.01); *B32B 5/26* (2013.01); *B32B 7/027* (2019.01); *B32B 37/06* (2013.01); *B32B 37/08* (2013.01); *B32B 37/1027* (2013.01); *B32B 2250/02* (2013.01); *B32B 2250/20* (2013.01); *B32B 2260/023* (2013.01); *B32B 2260/046* (2013.01); *B32B 2262/0284* (2013.01);
 (Continued)

(58) Field of Classification Search
 CPC . B32B 38/1833; B32B 37/18; B32B 2327/18; B32B 2419/00; B32B 2307/102; B32B 2305/07; B32B 2262/12; B32B 2262/062; B32B 2262/0284; B32B 2260/046; B32B 2260/023; B32B 2250/20; B32B 2250/02; B32B 2262/16; B32B 37/1027; B32B 37/08; B32B 37/06; B32B 5/26; B32B 5/02; B32B 7/027; B32B 38/08; G01D 11/24; G01N 33/0009
 See application file for complete search history.

(56) References Cited

FOREIGN PATENT DOCUMENTS

| JP | 2017-004023 A | 1/2017 |
| JP | 2017-048475 A | 3/2017 |
| JP | 2021172038 A | * 11/2021 |

OTHER PUBLICATIONS

Machine translation of JP2017-048475A (Year: 2017).*
Machine translation of JP2021172038A (Year: 2021).*
JP-2021172038-A (Year: 2021).*

* cited by examiner

*Primary Examiner* — Vishal I Patel
(74) *Attorney, Agent, or Firm* — Global IP Counselors, LLP

(57) ABSTRACT

A method of manufacturing a soundproof sheet includes a first accumulating step of producing a web in which a plurality of first fibers, which are natural fibers, and a plurality of second fibers including a first core portion and a first coating layer coating the first core portion and having a first melting point are mixed, a heating step of heating the web to melt the first coating layer, a pressurizing step of applying a predetermined compressive force to the web in a state where the first coating layer is melted, and a pressurized cooling step of cooling the web to solidify the first coating layer while still applying the predetermined compressive force.

8 Claims, 18 Drawing Sheets

(51) Int. Cl.
*B32B 5/26* (2006.01)
*B32B 7/027* (2019.01)
*B32B 37/06* (2006.01)
*B32B 37/08* (2006.01)
*B32B 37/10* (2006.01)

(52) U.S. Cl.
CPC ..... *B32B 2262/062* (2013.01); *B32B 2262/12* (2013.01); *B32B 2262/16* (2021.05); *B32B 2305/07* (2013.01); *B32B 2307/102* (2013.01); *B32B 2419/00* (2013.01)

METHOD OF MANUFACTURING SOUNDPROOF SHEET AND SOUNDPROOF SHEET

The present application is based on, and claims priority from JP Application Serial Number 2022-135664, filed Aug. 29, 2022, the disclosure of which is hereby incorporated by reference herein in its entirety.

BACKGROUND

1. Technical Field

The present disclosure relates to a method of manufacturing a soundproof sheet and a soundproof sheet.

2. Related Art

In the related art, a soundproof sheet containing a natural fiber such as a cellulose fiber and a resin has been known. For example, JP-A-2017-48475 discloses a plate-shaped fiber base material containing a natural fiber, a synthetic resin, and the like, in which the content of each material varies in the thickness direction.

However, the fiber base material described in JP-A-2017-48475 has a problem in that it is difficult to easily control an internal structure. Specifically, in order to form a structure in which the content ratio of each material varies, each material is accumulated so as to gradually vary the content ratio to produce a fiber accumulated material. This method is likely to lead to an increase in tact time and a complicated manufacturing step, and may affect the manufacturing cost. That is, there has been a demand for a method of manufacturing a soundproof sheet that easily controls an internal structure.

SUMMARY

According to an aspect of the present disclosure, there is provided a method of manufacturing a soundproof sheet including a first accumulating step of producing a first accumulated fiber body in which a plurality of first fibers, which are natural fibers, and a plurality of second fibers including a first core portion and a first coating layer coating the first core portion and having a first melting point are mixed, a heating step of heating the first accumulated fiber body to melt the first coating layer, a pressurizing step of applying a predetermined compressive force to the first accumulated fiber body in a state where the first coating layer is melted, and a pressurized cooling step of cooling the first accumulated fiber body to solidify the first coating layer while still applying the predetermined compressive force.

According to another aspect of the present disclosure, there is provided a method of manufacturing a soundproof sheet including a first accumulating step of producing a first accumulated fiber body in which a plurality of first fibers, which are natural fibers, and a plurality of second fibers including a first core portion and a first coating layer coating the first core portion and having a first melting point are mixed, a second accumulating step of producing a second accumulated fiber body in which a plurality of first fibers and a plurality of third fibers including a second core portion and a second coating layer coating the second core portion and having a second melting point higher than the first melting point are mixed, a heating step of stacking and heating the first accumulated fiber body and the second accumulated fiber body to melt the first coating layer and the second coating layer, a cooling step of cooling the stacked first accumulated fiber body and second accumulated fiber body to a temperature equal to or higher than the first melting point and lower than the second melting point to solidify the second coating layer without solidifying the first coating layer, a pressurizing step of applying a predetermined compressive force to the stacked first accumulated fiber body and second accumulated fiber body in which the second coating layer is solidified, and a pressurized cooling step of cooling the first accumulated fiber body and the second accumulated fiber body to a temperature lower than the first melting point to solidify the first coating layer and the second coating layer, while still applying the predetermined compressive force.

According to still another aspect of the present disclosure, there is provided the soundproof sheet manufactured by the method of manufacturing a soundproof sheet.

BRIEF DESCRIPTION OF THE DRAWINGS

FIG. 7 is a block diagram illustrating configurations of a pressurizing portion, a pressurized cooling portion, and the like.

DESCRIPTION OF EMBODIMENTS

Figure 5:
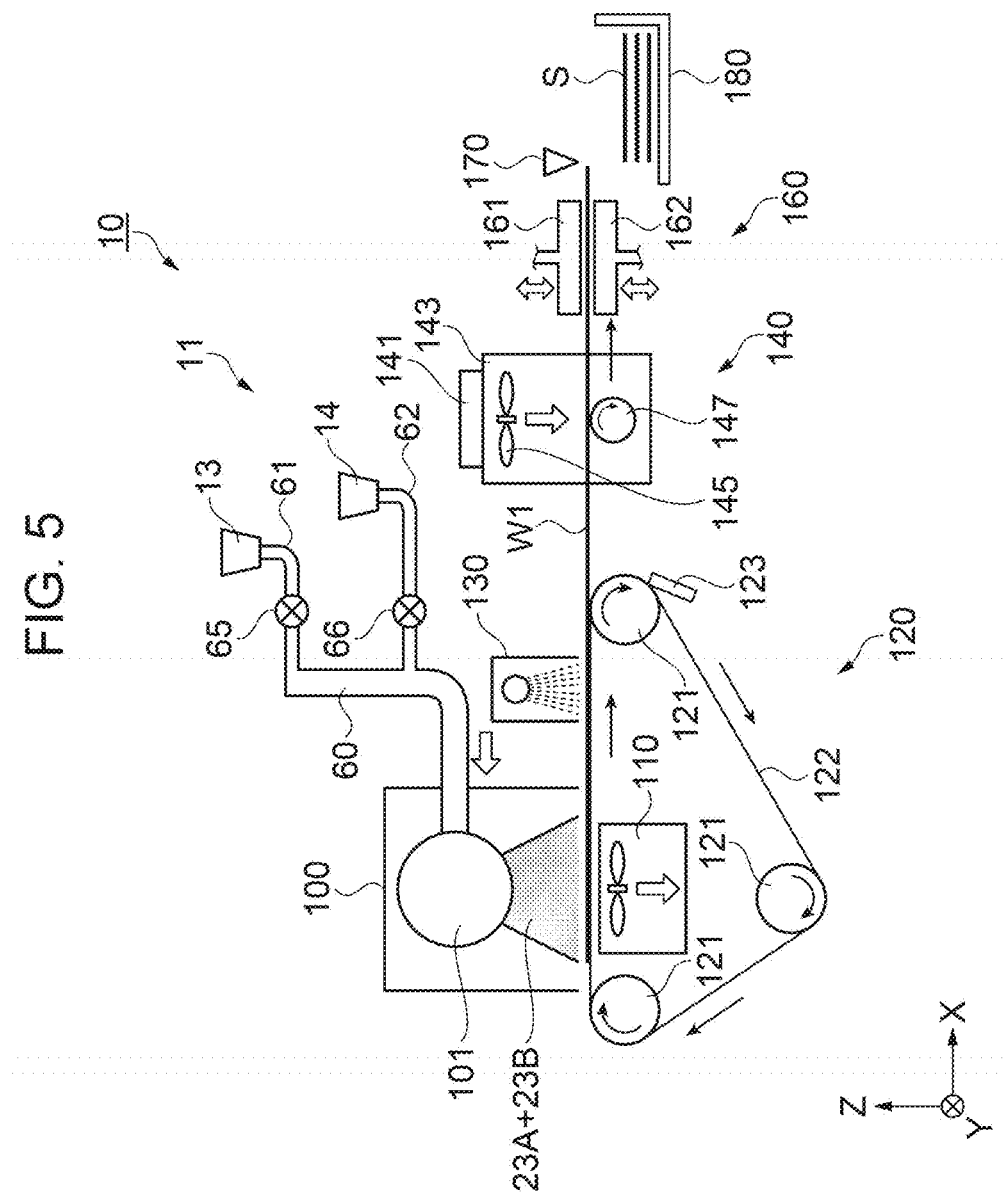
FIG. 5 is a schematic diagram illustrating a configuration of manufacturing apparatus of the soundproof sheet.

In the embodiments described below, a soundproof sheet S containing a natural fiber and the like and a method of manufacturing a soundproof sheet S will be illustrated and described with reference to the drawings. In each of the following drawings, XYZ axes, which are coordinate axes, are attached as necessary, and a direction indicated by an arrow is defined as a + direction, and a direction opposite to the + direction is defined as a − direction. The +Z direction may be referred to as an upward direction, and the −Z direction may be referred to as a downward direction. In FIG. 5, the −Z direction coincides with the vertical direction. In addition, for convenience of illustration, the size of each member is different from an actual size. In manufacturing apparatus 10 for the soundproof sheet S, a tip in the transport direction of the web W1, which is a first accumulated fiber body, or the soundproof sheet S may be referred to as downstream, and a side that goes back in the transport direction may be referred to as upstream. In the web W1 or the soundproof sheet S, the thickness is a distance along the Z axis, and the thickness direction is a direction along the Z axis.

1. First Embodiment

Figure 1:
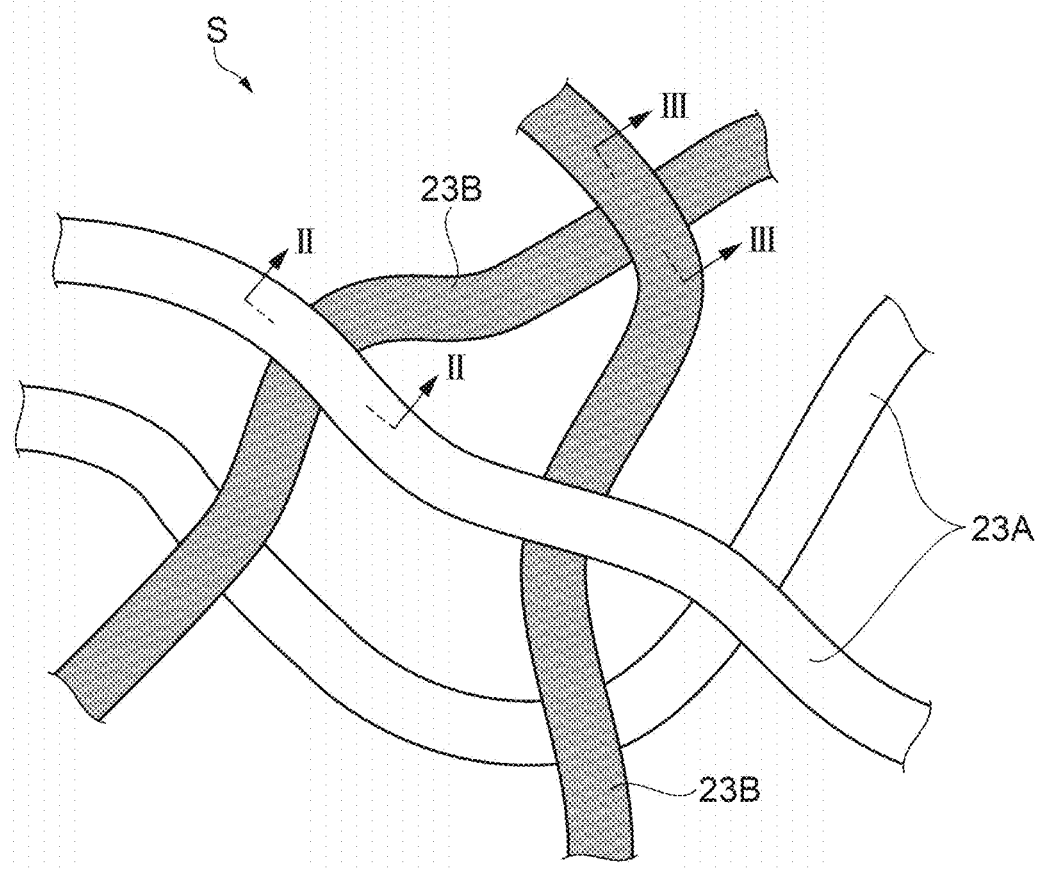
FIG. 1 is a schematic enlarged view of a soundproof sheet according to a first embodiment.

The soundproof sheet S according to the present embodiment is manufactured by a method of manufacturing a soundproof sheet S, which will be described later. As illustrated in FIG. 1, the soundproof sheet S contains a plurality of first fibers 23A and a plurality of second fibers 23B as raw materials. The plurality of first fibers 23A and the plurality of second fibers 23B are not oriented in a specific direction and are intertwined with each other. Contact points between the first fiber 23A and the second fiber 23B and contact points between the second fibers 23B are bonded by a first coating layer 232 described later of the second fiber 23B.

In the first fiber 23A, the number of contact points with the second fibers 23B is approximately one or more. In the second fiber 23B, the number of contact points with the first fibers 23A, or the other second fibers 23B is approximately one or more. The contact points of the first fibers 23A are not bonded, but the number of contact points is approximately one or more. As described above, in the soundproof sheet S, the plurality of first fibers 23A and the plurality of second fibers 23B are in contact with each other.

The soundproof sheet S has flexibility and strength derived from the above-described aspect. Uses of the soundproof sheet S include soundproofing materials for a house, an office, a store, a factory, and a music studio, and sound insulation materials for a vehicle such as an automobile, a ship, and airplane.

The first fiber 23A is a natural fiber. In the present embodiment, a cellulose fiber is applied as the first fiber 23A. Cellulose fibers are of plant origin, are relatively abundant natural materials, and are relatively inexpensive and easily available.

The cellulose fibers are obtained by subjecting raw materials such as paper, cardboard, pulp, pulp sheets, large sawdust, shavings, and wood to a defibrating treatment. The cellulose fibers are made mainly of cellulose, and may contain components other than cellulose. Examples of the components other than cellulose include hemicellulose, lignin, and the like.

The average fiber length of the first fiber 23A is preferably 10 μm or more and 50 mm or less, and more preferably 20 μm or more and 5 mm or less. As a result, the plurality of first fibers 23A and the plurality of second fibers 23B are likely to be entangled, and mechanical properties such as the strength of the soundproof sheet S can be improved. The average fiber lengths of the first fiber 23A and the second fiber 23B are measured by the staple diagram method.

Figure 2:
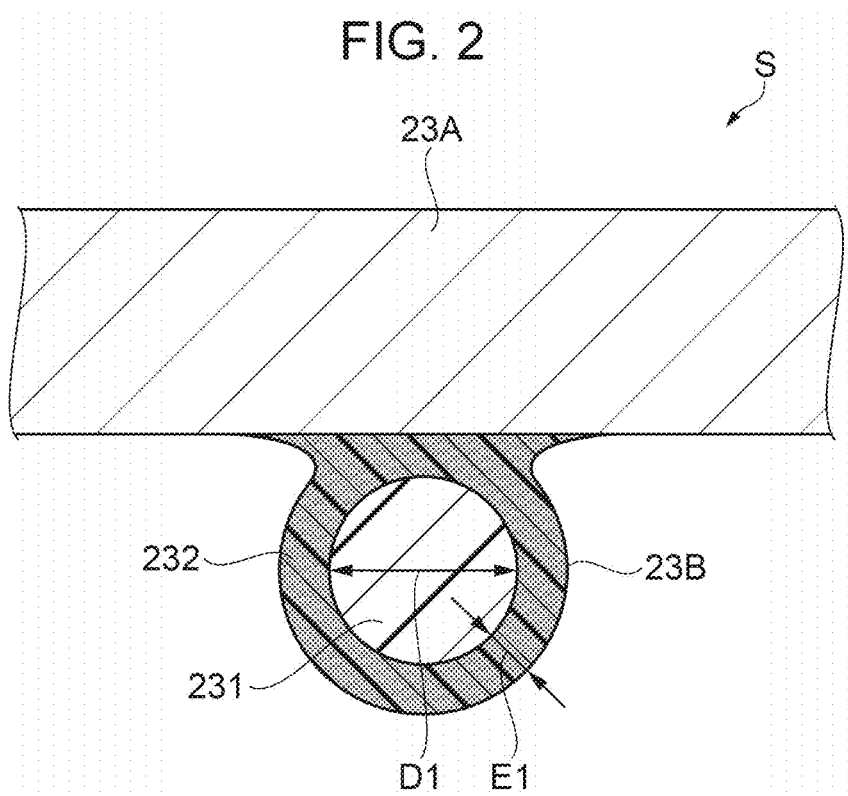
FIG. 2 is a cross-sectional view of a line segment II-II in FIG. 1.

As illustrated in FIG. 2, the second fiber 23B includes a first core portion 231 and a first coating layer 232 that coats the first core portion 231. The first coating layer 232 is thermoplastic and has a first melting point. The first coating layer 232 is melted by heating in a manufacturing step of a soundproof sheet S, which will be described later. FIG. 2 illustrates a state where the contact points between the first fiber 23A and the second fiber 23B are bonded by the first coating layer 232 which is melted and solidified.

The first core portion 231 is an organic fiber. Examples of the organic fiber include natural fibers such as the above-described cellulose fibers and synthetic fibers such as polyester and rayon. In the present embodiment, polyethylene terephthalate is applied as the first core portion 231. Polyethylene terephthalate has relatively high heat resistance derived from crystallinity and has advantages such as easy reuse from a PET bottle.

The first coating layer 232 is a thermoplastic resin. Examples of the thermoplastic resin include polyethylene, polypropylene, polyvinyl chloride, polyurethane, polystyrene, acrylic resin, and polyvinyl acetate. In the present embodiment, polyethylene is applied as the first coating layer 232. The average molecular weight of polyethylene can be easily changed at the manufacturing stage, and the melting point can be set relatively freely.

The first melting point of the first coating layer 232 is preferably approximately 20° C. lower than the melting point of the first core portion 231. As a result, when manufacturing the soundproof sheet S, it is easy to melt the first coating layer 232 without melting the first core portion 231. The melting point of the first coating layer 232 is preferably 100° C. or higher and 200° C. or lower, and more preferably 100° C. or higher and 150° C. or lower. The melting points of the first coating layer 232 and the second coating layer 234, which will be described later, are measured by JIS K 0064: 1992 (method of measuring melting point and a melting range of chemical products).

The average fiber length of the second fiber 23B, that is, the average fiber length of the first core portion 231 is preferably 100 μm or more and 5 mm or less, and more preferably approximately 1 mm. As a result, the plurality of second fibers 23B are likely to be entangled with the plurality of first fibers 23A, and mechanical properties such as the strength of the soundproof sheet S can be improved.

For example, the ratio of the diameter D1 of the first core portion 231 to the thickness E1 of the first coating layer 232 is preferably 0.2 or more and 2.0 or less, and more preferably 0.5 or more and 1.5 or less. As a result, in a heating step when the soundproof sheet S is manufactured, the first coating layer 232 can be melted and solidified while suppressing the deformation of the first core portion 231.

Figure 3:
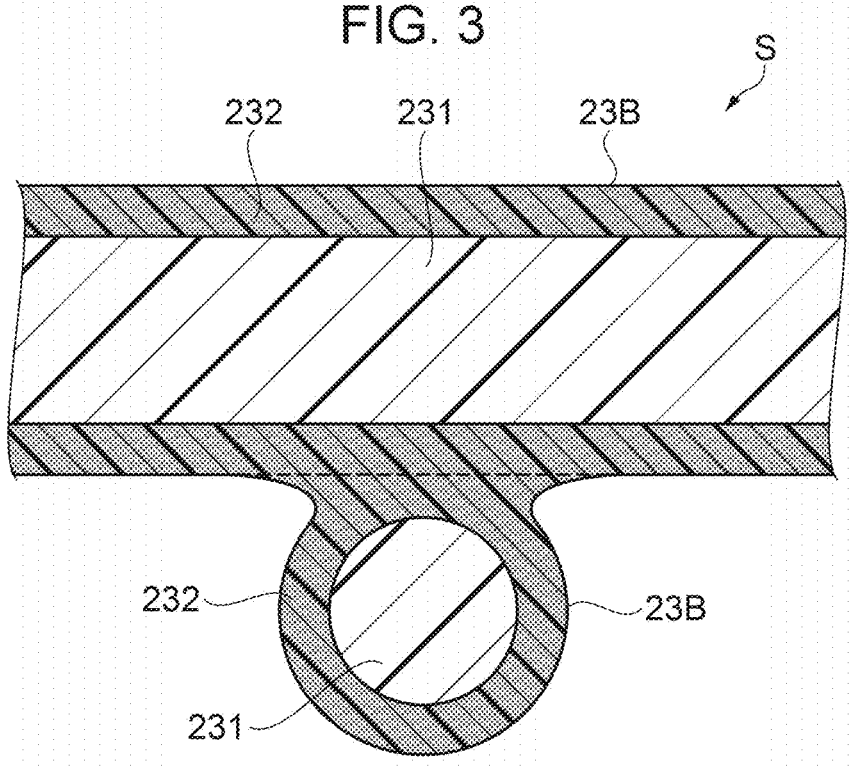
FIG. 3 is a cross-sectional view of a line segment III-III in FIG. 1.

As illustrated in FIG. 3, the first coating layer 232 binds the contact points of the second fibers 23B. The contact points between the second fibers 23B are bonded by the mutual first coating layers 232 melted and solidified by heating in the manufacturing step. Since the contact points between the first fiber 23A and the second fiber 23B and the contact points between the second fibers 23B described above are bonded by the first coating layer 232, the shape of the soundproof sheet S can be easily maintained. In addition, soundproof characteristics and strength of the soundproof sheet S are improved.

Figure 4:
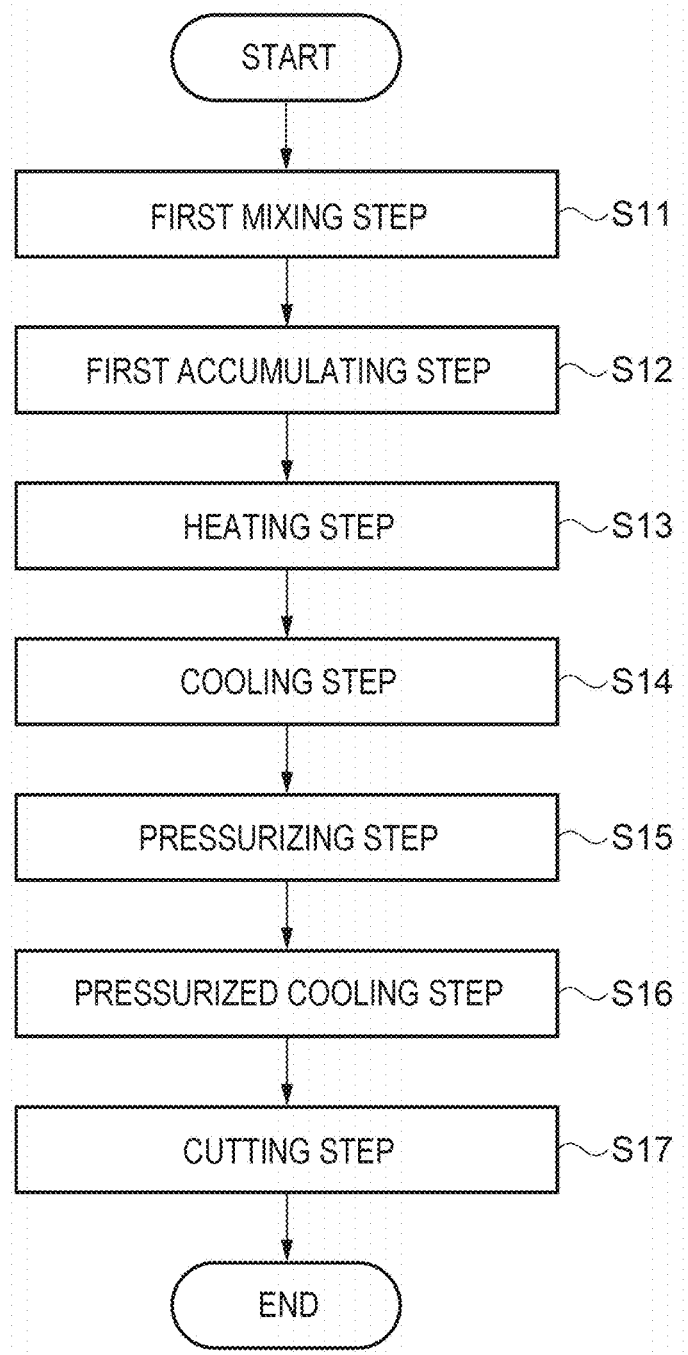
FIG. 4 is a flow chart illustrating a method of manufacturing a soundproof sheet.

As illustrated in FIG. 4, a method of manufacturing a soundproof sheet S according to the present embodiment includes a first mixing step S11, a first accumulating step S12, a heating step S13, a cooling step S14, a pressurizing step S15, a pressurized cooling step S16, and a cutting step S17. In the method of manufacturing a soundproof sheet S, the soundproof sheet S is manufactured through each step in the above order from the upstream first mixing step S11 to the downstream cutting step S17. The method of manufacturing a soundproof sheet according to the present disclosure includes a first accumulating step S12, a heating step S13, a pressurizing step S15, and a pressurized cooling step S16, and the other steps are not limited to those described above. In addition, the soundproof sheet of the present disclosure may be wound into a roll shape, stored, and sold in a state where the pressurized cooling step S16 is completed and the cutting step S17 is not completed.

A specific example of a method of manufacturing a soundproof sheet S will be described with the manufacturing apparatus 10 for the soundproof sheet S. The manufacturing apparatus 10 for the soundproof sheet S according to the present embodiment is an example, and the present disclosure is not limited thereto.

As illustrated in FIG. 5, the manufacturing apparatus 10 is provided with a mixing portion 11, an accumulating portion 100, a web transport portion 120, a humidifying portion 130, a heating portion 140, a pressurized cooling portion 160, a cutting portion 170, and a tray 180 which is a storage portion from upstream to downstream. Although not illustrated, the manufacturing apparatus 10 is also provided with an apparatus control portion that integrally controls the operation of each of the above configurations. Although details will be described later, in the manufacturing apparatus 10, the pressurizing portion that performs the cooling step S14 and the pressurizing step S15 also serves as the pressurized cooling portion 160 that performs the pressurized cooling step S16.

The first mixing step S11 is performed in the mixing portion 11. The mixing portion 11 mixes the first fiber 23A, the second fiber 23B, and the like in the air to generate a first mixture. The mixing portion 11 includes a tubular main body portion 60, hoppers 13 and 14 coupled to the main body portion 60, supply pipes 61 and 62, and valves 65 and 66.

The hopper 13 communicates with an inside of the main body portion 60 through the supply pipe 61. In the supply pipe 61, the valve 65 is provided between the hopper 13 and the main body portion 60. The hopper 13 supplies the first fiber 23A into the main body portion 60. The valve 65 adjusts the mass of the first fiber 23A supplied from the hopper 13 to the main body portion 60.

The hopper 14 communicates with an inside of the main body portion 60 through the supply pipe 62. In the supply pipe 62, the valve 66 is provided between the hopper 14 and the main body portion 60. The hopper 14 supplies the second fiber 23B into the main body portion 60. The valve 66 adjusts the mass of the second fiber 23B supplied from the hopper 14 to the main body portion 60. The valves 65 and 66 adjust the mixing ratio of the first fiber 23A and the second fiber 23B.

Specifically, the first mixture containing the first fiber 23A and the second fiber 23B is the web W1 which is a first accumulated fiber body in the accumulating portion 100 described later. In the web W1, the content of the second fiber 23B to the content of the first fiber 23A is preferably 12.0% by mass or more and 40.0% by mass or less, and more preferably 14.0% by mass or more and 25.0% by mass or less. As a result, mechanical properties such as the strength of the soundproof sheet S can be improved while suppressing the content of the first coating layer 232 of the second fiber 23B.

Here, the second fiber 23B produced by a device known separately is supplied to the hopper 14. In addition, a heat kneader or the like may be disposed upstream of the hopper 14 to supply the second fiber 23B produced by the heat kneader to the hopper 14. In the heat kneader, the first coating layer 232 is formed on the first core portion 231.

As the first core portion 231 of the first fiber 23A and the second fiber 23B, a fiber produced by subjecting waste paper, waste cloth, or the like to a defibrating treatment may be used. In addition, an additive may be supplied from any of the hoppers 13 and 14 and contained in the web W1. Examples of the additive include a colorant, a flame retardant, an insect repellent, an antifungal agent, an antioxidant, an ultraviolet absorber, an aggregation inhibitor, and a mold release agent.

The first fiber 23A, the second fiber 23B, and the like are mixed while being transported to the accumulating portion 100 in the main body portion 60 to form a first mixture. In order to promote the generation of the first mixture in the main body portion 60 and improve the transportability of the first mixture, a blower or the like that generates an airflow may be disposed in the main body portion 60. The first mixture is transported to the accumulating portion 100 via the main body portion 60. The step proceeds to the first accumulating step S12.

In the accumulating portion 100, the first accumulating step S12 is performed. The accumulating portion 100 accumulates the first mixture in the air to produce a web W1 in which the plurality of first fibers 23A and the plurality of second fibers 23B are mixed. The accumulating portion 100 includes a drum portion 101. The accumulating portion 100 has a substantially box-like shape with an open bottom, and the drum portion 101 is disposed above the inside. The accumulating portion 100 takes in the first mixture from the main body portion 60 into the inside of the drum portion 101 and accumulates the first mixture on a mesh belt 122 by a dry method.

The web transport portion 120 including the mesh belt 122 and a suction mechanism 110 is disposed below the accumulating portion 100. The suction mechanism 110 faces the drum portion 101 with the mesh belt 122 interposed therebetween in the direction along the Z axis.

The drum portion 101 is a cylindrical sieve that is rotationally driven by a motor (not illustrated). A mesh having a function of a sieve is provided on the side surface of the cylindrical drum portion 101. The drum portion 101 allows particles such as fibers and a first mixture smaller than the size of the mesh opening of the sieve mesh to pass from the inside to the outside. In the first mixture, the entangled fibers are loosened by the drum portion 101 and dispersed in the air in the accumulating portion 100.

The first fiber 23A, the second fiber 23B, and the like are dispersed in the air in the accumulating portion 100 and are randomly accumulated on the mesh belt 122. Therefore, in the web W1, the first fiber 23A and the second fiber 23B are unlikely to be oriented in a specific direction.

The sieve of the drum portion 101 may not have a function of selecting large fibers or the like in the first mixture. That is, the drum portion 101 may loosen the fibers of the first mixture and release all of the first mixtures into the accumulating portion 100. The first mixture dispersed in the air in the accumulating portion 100 is accumulated above the mesh belt 122 by gravity and suction of the suction mechanism 110.

The web transport portion 120 is provided with the mesh belt 122 and the suction mechanism 110. The web transport portion 120 promotes the accumulation of the first mixture on the mesh belt 122 by the suction mechanism 110. In addition, the web transport portion 120 transports the web W1 formed from the first mixture downstream by rotating the mesh belt 122.

The suction mechanism 110 is disposed below the drum portion 101. The suction mechanism 110 sucks the air into the accumulating portion 100 through a plurality of holes included in the mesh belt 122. As a result, the first mixture released to the outside of the drum portion 101 is sucked downward together with the air and accumulated on the upper surface of the mesh belt 122. A known suction device, such as a blower, is adopted for the suction mechanism 110.

The plurality of holes in the mesh belt 122 allow air to pass through, and make it difficult for the first fiber 23A, the second fiber 23B, and the like contained in the first mixture to pass through. The mesh belt 122 is an endless belt and is stretched by three stretch rollers 121.

The upper part of the mesh belt 122 is moved downstream due to the rotation of the stretch roller 121. In other words, the mesh belt 122 rotates clockwise in FIG. 5. As the mesh belt 122 is rotated by the stretch roller 121, the first mixture is continuously accumulated to form the web W1. The web W1 contains a relatively large amount of air and is soft and swollen. The web W1 is transported downstream as the mesh belt 122 moves.

A scraper 123 is attached below the stretch roller 121 disposed most in the +X direction of the three stretch rollers 121. The scraper 123 comes into contact with the surface of the mesh belt 122 finished transporting the web W1. The mesh belt 122 comes into contact with the scraper 123 while rotating, so that the first mixture remaining on the surface is removed.

The humidifying portion 130 is disposed downstream the accumulating portion 100. The humidifying portion 130 sprays water onto the web W1 on the mesh belt 122 to humidify the web W1. As a result, scattering and dust generation of the first fiber 23A and the second fiber 23B contained in the web W1 are suppressed. In addition, the water used for the humidification may be impregnated with a water-soluble additive or the like, and the web W1 may be impregnated with the additive in parallel with the humidification.

The web W1 is transported downstream by the mesh belt 122 and is detached from the mesh belt 122. The web W1 is drawn into the inside of a heat radiating portion 143 of the heating portion 140 by the transport roller 147 of the heating portion 140. The step proceeds to the heating step S13.

It is preferable that the heating step S13 to the pressurized cooling step S16 described below are continuously performed on the web W1 produced in the first accumulating step S12. The heating step S13 is performed using the heating portion 140. The heating portion 140 heats the web W1 drawn into the inside to a temperature equal to or higher than the first melting point of the first coating layer 232 of the second fiber 23B to melt the first coating layer 232. As a result, the web W1 becomes a molten fiber body. The heating portion 140 includes a heat source portion 141, a heat radiating portion 143, and a blower portion 145.

The heat radiating portion 143 has a substantially box-like shape, and houses the heat source portion 141 and the blower portion 145 above the inside. Below the heat radiating portion 143, the web W1 is transported from the −X direction to the +X direction.

The heat source portion 141 is disposed above the heat radiating portion 143 and faces the web W1 with the blower portion 145 interposed therebetween. The heat source portion 141 radiates heat downward in the heat radiating portion 143. The heat source portion 141 is, for example, a heating device such as an infrared heater. The heating portion 140 may have a configuration in which the heating portion 140 is in contact with the web W1 to heat the web W1, such as a hot plate, or may be a hot air circulation type constant temperature bath.

The blower portion 145 transports the heat generated by the heat source portion 141 to the web W1 moving downward in the heat radiating portion 143 by blowing air. The web W1 is heated in a non-contact manner while being transported in the heat radiating portion 143. Therefore, the unevenness of the temperature is unlikely to occur, and it is possible to suppress deterioration due to insufficient heating and uneven distribution of heat in the web W1. The web W1 may be transported in the heat radiating portion 143 by an endless belt or the like instead of the transport roller 147.

Figure 6:
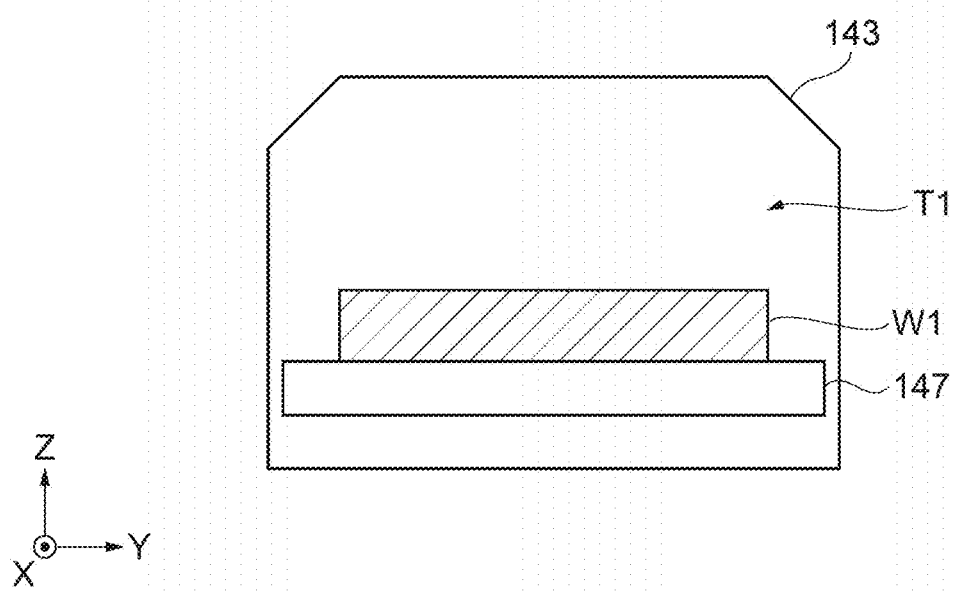
FIG. 6 is a schematic diagram illustrating a method of manufacturing a soundproof sheet.

With the above configuration, as illustrated in FIG. 6, the temperature inside the heat radiating portion 143 is raised to the heating temperature T1. The heating temperature T1 of the web W1 in the heating step S13 is appropriately set by the melting point of the first fiber 23A, the melting point of the first core portion 231 of the second fiber 23B, and the first melting point of the first coating layer 232. That is, the heating temperature T1 of the web W1 in the heating portion 140 is set to be the first melting point of the first coating layer 232 or higher, lower than the melting point of the first fiber 23A, and lower than the melting point of the first core portion 231. For example, when the melting point of the first core portion 231 is 260° C. and the melting point of the first coating layer 232 is 125° C., the heating temperature T1 is set to 190° C.

Here, the web W1 is formed by mixing and accumulating the first fibers 23A, the second fibers 23B, and the like. Therefore, the web W1 that reaches the heating portion 140 is not pressurized, contains a relatively large amount of air, and has a low density. By heating the web W1 in a state where the density is relatively low, the efficiency of heating can be improved and the energy required for heating can be reduced. The step proceeds to the cooling step S14.

Returning to FIG. 5, the cooling step S14 is performed using the pressurized cooling portion 160. The pressurized cooling portion 160 includes a first pressurized cooling portion 161 and a second pressurized cooling portion 162. The pressurized cooling portion 160 has a function of interposing the web W1 between the first pressurized cooling portion 161 and the second pressurized cooling portion 162 to perform cooling and pressurization. For example, the pressurized cooling portion 160 is a press device capable of pressurizing the web W1 while cooling the web W1.

The first pressurized cooling portion 161 and the second pressurized cooling portion 162 are disposed so as to face each other in the vertical direction. A surface facing downward, that is, a lower surface of the first pressurized cooling portion 161, and a surface facing upward, that is, an upper surface of the second pressurized cooling portion 162 are formed on substantially flat surfaces, and cooled to a temperature lower than the ambient temperature by a cooling mechanism (not illustrated). The web W1 is cooled by coming into contact with the lower surface of the first pressurized cooling portion 161 and the upper surface of the second pressurized cooling portion 162.

Figure 7:
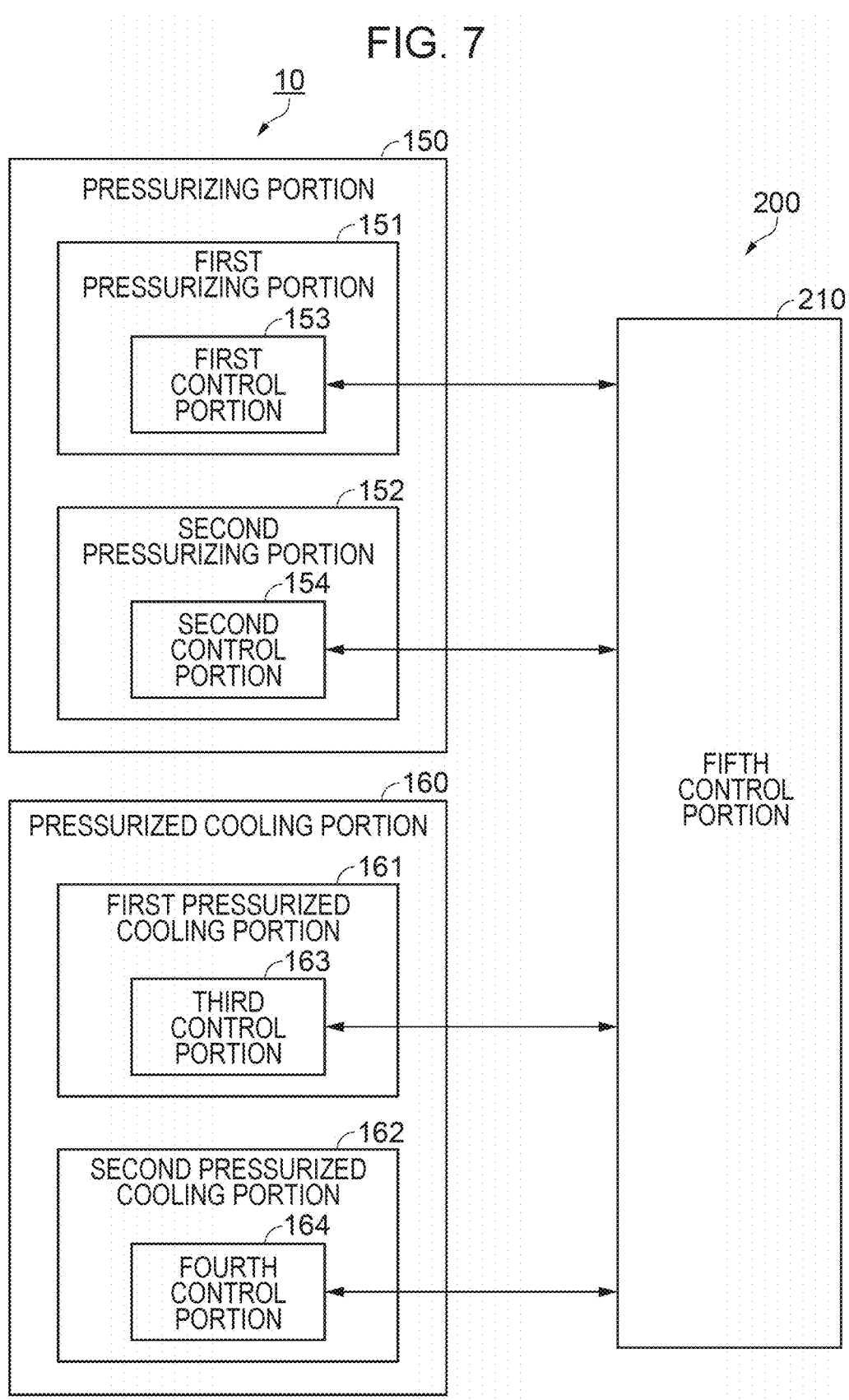

Here, as illustrated in FIG. 7, the manufacturing apparatus 10 may include a pressurizing portion 150 and a pressurized cooling portion 160. That is, the cooling step S14 and the pressurizing step S15 may be performed by the pressurizing portion 150, and the pressurized cooling step S16 may be performed by a separate pressurized cooling portion 160, which is different from the pressurizing portion 150.

In the above case, the pressurizing portion 150 includes a first pressurizing portion 151 and a second pressurizing portion 152. The pressurizing portion 150 is a press device capable of pressurizing the web W1 while cooling the web W1 in the same manner as the pressurized cooling portion 160.

The first pressurizing portion 151 and the second pressurizing portion 152 are disposed to face each other in the vertical direction in the same manner as the pressurized cooling portion 160. The surface facing downward of the first pressurizing portion 151 and the surface facing upward of the second pressurizing portion 152 are formed on substantially flat surfaces, and are cooled to a temperature lower than the ambient temperature by a cooling mechanism (not illustrated). The web W1 is cooled by coming into contact with the lower surface of the first pressurizing portion 151 and the upper surface of the second pressurizing portion 152.

The first pressurizing portion 151 includes a first control portion 153, and the second pressurizing portion 152 includes a second control portion 154. The first pressurized cooling portion 161 includes a third control portion 163, and the second pressurized cooling portion 162 includes a fourth control portion 164. Although not illustrated, each of the first control portion 153, the second control portion 154, the third control portion 163, and the fourth control portion 164 includes a central processing unit (CPU), a system bus, a read only memory (ROM), a random access memory (RAM), and the like.

Although not illustrated, each of the first control portion 153, the second control portion 154, the third control portion 163, and the fourth control portion 164 includes a cooling mechanism. A known cooling device is applied to the cooling mechanism. In the present embodiment, a Pelche element is applied as the cooling mechanism. The known cooling device may be a cold air device.

The first control portion 153, the second control portion 154, the third control portion 163, and the fourth control portion 164 are electrically coupled to the fifth control portion 210 and are integrally controlled by the fifth control portion 210. The fifth control portion 210 is provided in an external device 200 for the manufacturing apparatus 10. That is, the press device and the cooling mechanism of the pressurizing portion 150 and the press device and the cooling mechanism of the pressurized cooling portion 160 are controlled by the fifth control portion 210 of the external device 200. For example, the external device 200 is an information terminal device such as a personal computer.

As a result, since the first pressurizing portion 151, the second pressurizing portion 152, the first pressurized cooling portion 161, and the second pressurized cooling portion 162 are individually controlled by the fifth control portion 210, it is possible to precisely and integrally control the press pressure and the cooling temperatures $T2$ and $T3$ described later.

The first control portion 153, the second control portion 154, the third control portion 163, and the fourth control portion 164 may have a temperature measurement function. As a result, the temperature of the web W1 and each surface temperature can be transmitted to the fifth control portion 210 to more precisely control the cooling temperatures $T2$ and $T3$ of the web W1.

In addition, the first control portion 153, the second control portion 154, the third control portion 163, and the fourth control portion 164 may include a pressurizing device and a cooling device separately. In that case, the press device and the cold air device may be used in combination. In addition, the pressurizing portion 150 or the pressurized cooling portion 160 may be a pair of pressurizing rollers provided with a cooling mechanism.

As described above, the manufacturing apparatus 10 may be provided with the pressurizing portion 150 and the pressurized cooling portion 160. In the present embodiment, as described above, the pressurizing portion 150 is integrated with the pressurized cooling portion 160, and the function of the pressurizing portion 150 is assigned to the pressurized cooling portion 160.

Figure 8:
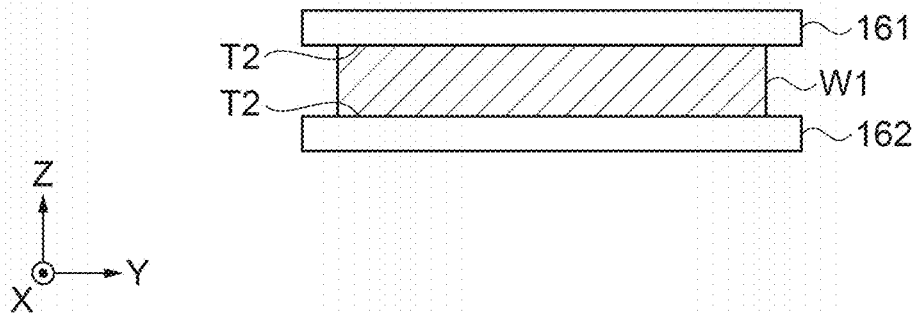
FIG. 8 is a schematic diagram illustrating a method of manufacturing a soundproof sheet.

More specifically, as illustrated in FIG. 8, the web W1 is interposed between the first pressurized cooling portion 161 and the second pressurized cooling portion 162. At this time, the lower surface of the first pressurized cooling portion 161 is brought into contact with the upper surface of the web W1, and the upper surface of the second pressurized cooling portion 162 is brought into contact with the lower surface of the web W1. The first pressurized cooling portion 161 and the second pressurized cooling portion 162 and the web W1 are only in contact with each other, and no compressive force is applied to the web W1. The heat of the web W1 propagates to the first pressurized cooling portion 161 and the second pressurized cooling portion 162 to cool the web W1.

In the cooling step S14, a temperature at which the web W1 is cooled, that is, a cooling temperature $T2$ is defined as a lower limit of a temperature exceeding the first melting point of the first coating layer 232. That is, while the first coating layer 232 is still melted, the step proceeds to the pressurizing step S15 of the next step. Details will be described later, but when the internal structure of the soundproof sheet S has a relatively high density, the cooling step S14 may be omitted. The step proceeds to the pressurizing step S15.

Figure 9:
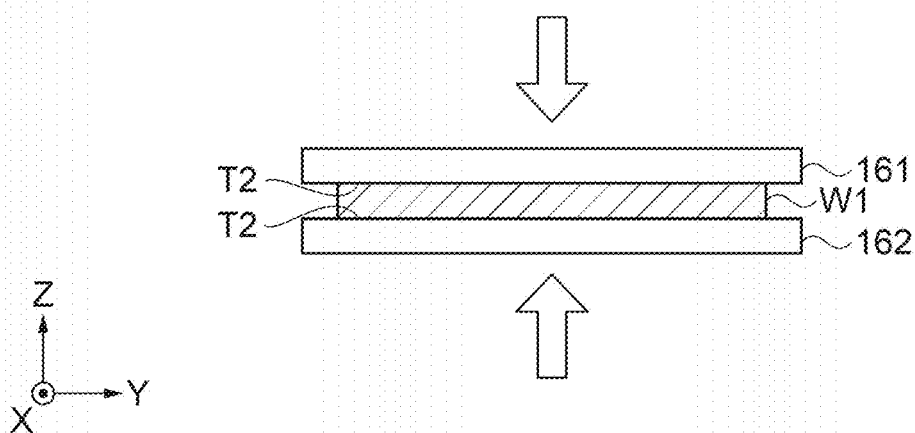
FIG. 9 is a schematic diagram illustrating a method of manufacturing a soundproof sheet.

The pressurizing step S15 is also performed using the pressurized cooling portion 160. In the pressurizing step S15, a predetermined compressive force is applied to the web W1 in a state where the first coating layer 232 of the second fiber 23B is melted. Specifically, as illustrated in FIG. 9, the distance between the first pressurized cooling portion 161 and the second pressurized cooling portion 162 along the Z axis is shortened, and a compressive force is applied to the web W1 between the first pressurized cooling portion 161 and the second pressurized cooling portion 162.

At this time, each surface of the first pressurized cooling portion 161 and the second pressurized cooling portion 162 in contact with the web W1 is kept at the cooling temperature $T2$. Therefore, in the web W1, the melting of the first coating layer 232 of the second fiber 23B is maintained.

As a result, binding of the contact points between the first fiber 23A and the second fiber 23B and the contact points between the second fibers 23B described above is unlikely to proceed. Therefore, the mechanical strength of the web W1 is low, the web W1 is easily compressed in the vertical direction by the applied compressive force, and the internal structure has a relatively high density.

The compression ratio of the thickness of the web W1 in the vertical direction by the predetermined compressive force is preferably 10% or more. As a result, since the density of the soundproof sheet S is increased, it is possible to improve sound insulation characteristics among the soundproof characteristics. In addition, the density of the soundproof sheet S can be changed by adjusting the compression ratio. That is, when the compression ratio is increased, the density of the soundproof sheet S increases, and when the compression ratio is decreased, the density decreases. The relationship between the density of the soundproof sheet S and the sound insulation characteristics will be described later. The step proceeds to the pressurized cooling step S16.

Figure 10:
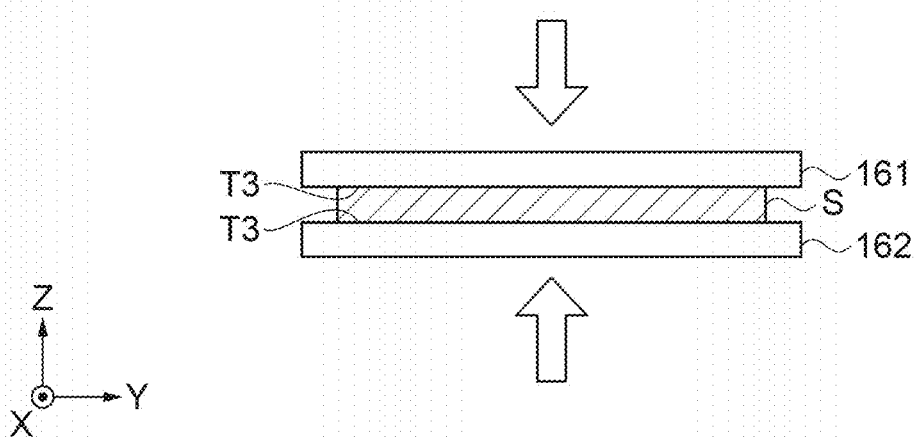
FIG. 10 is a schematic diagram illustrating a method of manufacturing a soundproof sheet.

The pressurized cooling step S16 is also performed using the pressurized cooling portion 160. As illustrated in FIG. 10, in the pressurized cooling step S16, the web W1 is cooled to a cooling temperature T3 while still applying the predetermined compressive force in the pressurizing step S15. That is, the application of compressive force and cooling are performed between the first pressurized cooling portion 161 and the second pressurized cooling portion 162. The cooling temperature T3 of the web W1 in the pressurized cooling step S16 is set to a temperature lower than the first melting point of the first coating layer 232. As a result, the first coating layer 232 is solidified, and the contact points between the first fiber 23A and the second fiber 23B and the contact points between the second fibers 23B are bonded by the solidified first coating layer 232 to form the soundproof sheet S, which is a binding fiber body. The soundproof sheet S subjected to the pressurized cooling step S16 has a continuous form shape. The step proceeds to the cutting step S17.

Returning to FIG. 5, the cutting step S17 is performed using the cutting portion 170. The cutting portion 170 cuts the continuous form-shaped soundproof sheet S into a desired shape. Although not illustrated, the cutting portion 170 includes a vertical blade and a horizontal blade.

The vertical blade cuts, for example, the continuous form-shaped soundproof sheet S along the X axis. The horizontal blade cuts, for example, the continuous form-shaped soundproof sheet S along the Y axis. As a result, a substantially rectangular plate-shaped soundproof sheet S is manufactured and accommodated in the tray 180.

In the cooling step S14 described above, the cooling temperature T2 of the web W1 may be set to be lower than the first melting point of the first coating layer 232 to manufacture the soundproof sheet S having a relatively low density. Specifically, the cooling step S14 is continuously performed until the temperature of the web W1 is lower than the first melting point to solidify the first coating layer 232. As a result, in the web W1, the contact points between the first fiber 23A and the second fiber 23B and the contact points between the second fibers 23B are bonded by the first coating layer 232.

Therefore, in the pressurizing step S15 and the pressurized cooling step S16 following the cooling step S14, the web W1 is unlikely to be compressed against the applied compressive force. Therefore, in the pressurizing step S15 and the like, the compression ratio of the thickness of the web W1 in the vertical direction is relatively low, and it is possible to manufacture the soundproof sheet S having a relatively low density. That is, the density of the soundproof sheet S can be easily adjusted by adjusting the cooling temperature T2 of the web W1 in the cooling step S14.

Figure 11:
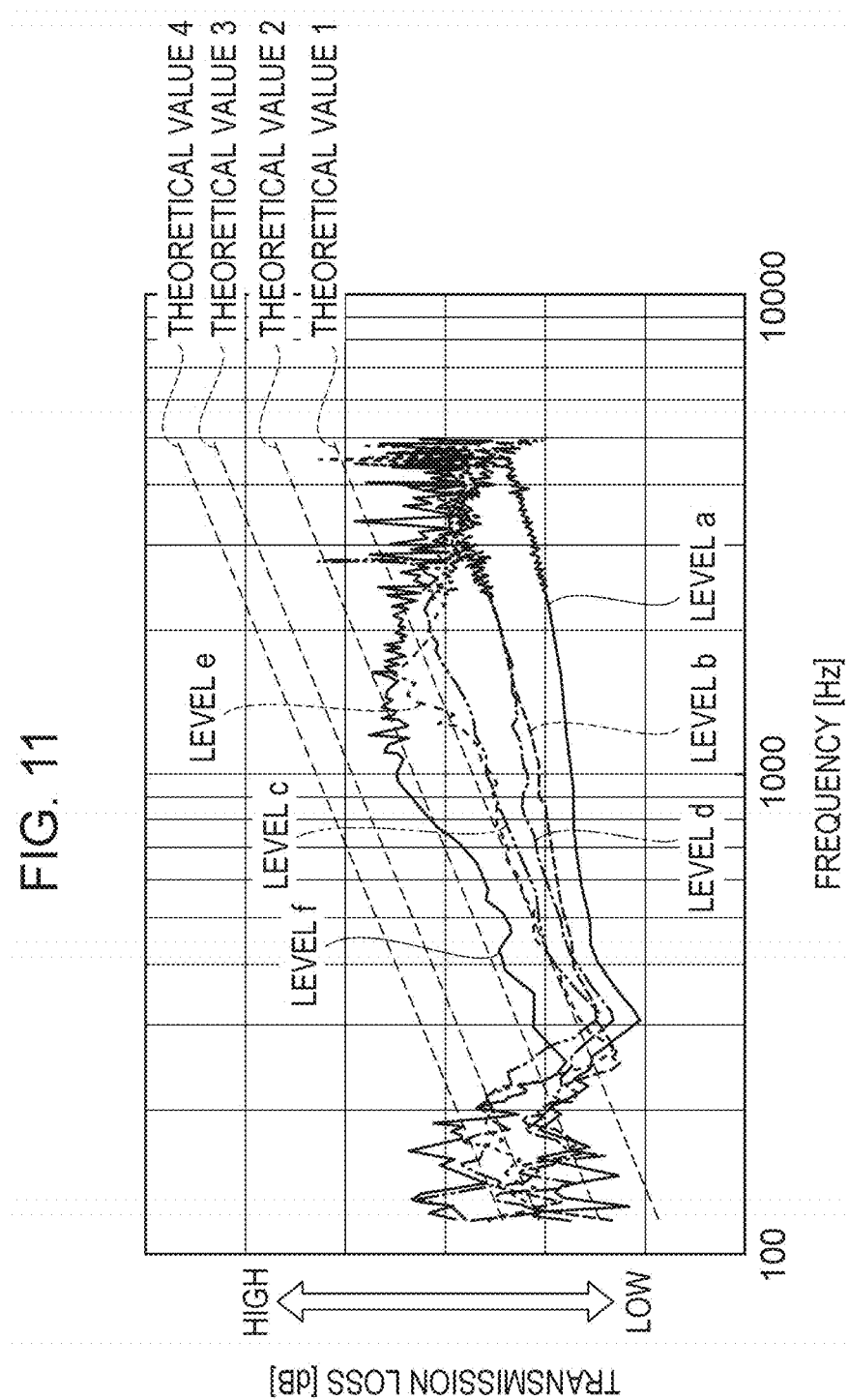
FIG. 11 is a graph illustrating sound insulation characteristics depending on a density of the soundproof sheet.

Here, the relationship between the density of the soundproof sheet S and the sound insulation characteristics among the soundproof characteristics will be described. FIG. 11 illustrates changes in transmission loss when the sound wave is applied to a sample in which the density and thickness of the soundproof sheet S are changed while changing the frequency. In FIG. 11, the horizontal axis represents the frequency of the sound wave "Hz", and the vertical axis represents the transmission loss "dB". The transmission loss is one index of the sound insulation characteristics, and the higher the value, the more difficult it is for the sound wave to pass through, and the better the sound insulation characteristics.

In FIG. 11, levels a and d are samples having a density of 0.05 g/cm$^3$, levels b and e are samples having a density of 0.10 g/cm$^3$, and levels c and f are samples having a density of 0.15 g/cm$^3$. The thicknesses of levels a, b, and c were set to 20 mm, and the thicknesses of levels d, e, and f were set to 40 mm.

Theoretical value 1 is a line segment calculated under the condition of 1000 g/m$^2$, theoretical value 2 is a line segment calculated under the condition of 2000 g/m$^2$, theoretical value 3 is a line segment calculated under the condition of 4000 g/m$^2$, and theoretical value 4 is a line segment calculated under the condition of 6000 g/m$^2$.

As illustrated in FIG. 11, differences in the sound insulation characteristics appear at each level between approximately 300 Hz and 2000 Hz. It can be seen that, as a whole, the higher the density and the thicker the thickness, the better the sound insulation characteristics.

According to the present embodiment, it is possible to obtain the following effects.

The internal structure of the soundproof sheet S can be easily controlled. Specifically, by adjusting the cooling temperature T2 of the web W1, the compression ratio of the web W1 can be changed, and the thickness and density of the soundproof sheet S can be easily changed. That is, it is possible to provide a method of manufacturing a soundproof sheet S in which the internal structure is easily controlled, and a soundproof sheet S manufactured by the method of manufacturing.

2. Second Embodiment

The soundproof sheet S according to the present embodiment is manufactured by a method of manufacturing a soundproof sheet S according to the present embodiment, which will be described later. The soundproof sheet S of the present embodiment is different from the soundproof sheet S of the first embodiment in that the soundproof sheet S includes a web W1 which is a first accumulated fiber body and a web W2 which is a second accumulated fiber body. Hereinafter, the description of the configuration overlapping with that of the first embodiment will be omitted. The manufacturing apparatus 10 described above is also used in the method of manufacturing a soundproof sheet S of the present embodiment. In the following description, FIG. 5 of the first embodiment will also be referred to.

The soundproof sheet S of the present embodiment has a high density region L2 derived from a web W1 described later and a low density region L1 derived from the web W2. The high density region L2 has an aspect similar to the relatively high density internal structure in the soundproof sheet S of the first embodiment.

Figure 12:
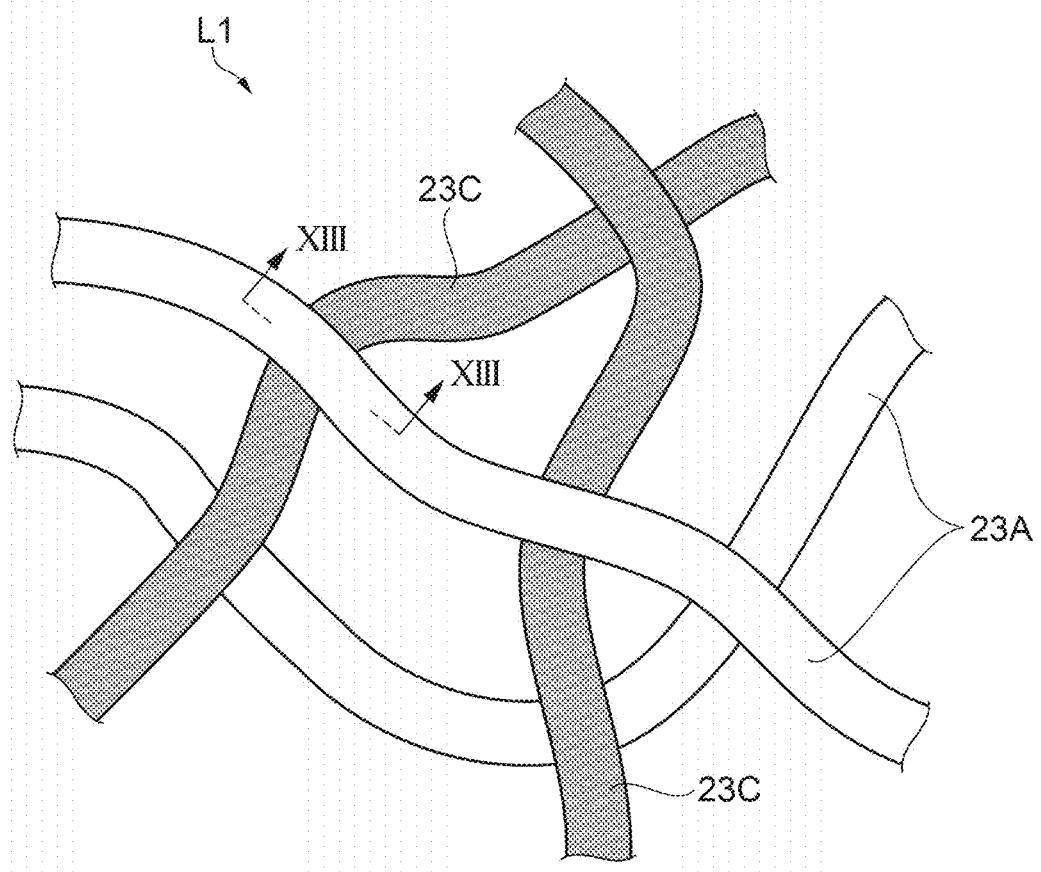
FIG. 12 is a schematic enlarged view of a low density region of a soundproof sheet according to a second embodiment.

As illustrated in FIG. 12, the low density region L1 included in the soundproof sheet S of the present embodiment includes a plurality of first fibers 23A and a plurality of third fibers 23C as raw materials. The plurality of first fibers 23A and the plurality of third fibers 23C are not oriented in a specific direction and are intertwined with each other. The contact points between the first fiber 23A and the third fiber 23C and the contact points between the third fibers 23C are bonded by a second coating layer 234 described later of the third fiber 23C.

In the first fiber 23A, the number of contact points with the third fibers 23C is approximately one or more. In the third fiber 23C, the number of contact points with the first fibers 23A, or the other third fibers 23C is approximately one or more. The contact points of the first fibers 23A are not bonded, but the number of contact points is approximately one or more. As described above, even in the low density region L1, the plurality of first fibers 23A and the plurality of third fibers 23C are in contact with each other.

Figure 13:
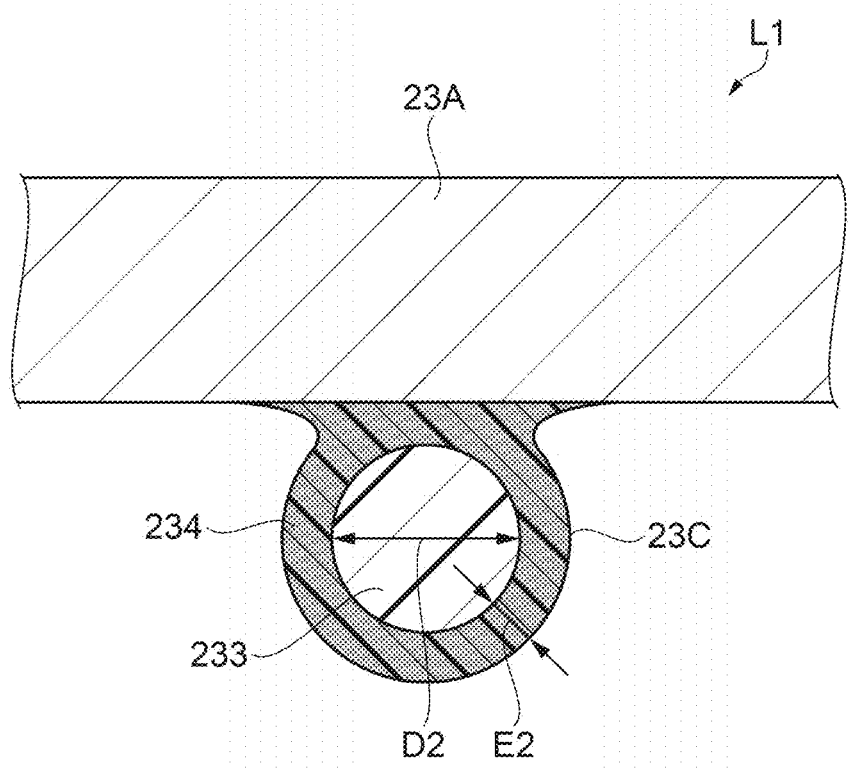
FIG. 13 is a cross-sectional view of a line segment XIII-XIII in FIG. 12.

As illustrated in FIG. 13, the third fiber 23C includes a second core portion 233 and a second coating layer 234 that coats the second core portion 233. The second coating layer 234 is thermoplastic and has a second melting point. The second coating layer 234 is melted by heating in a manufacturing step of a soundproof sheet S of the present embodiment, which will be described later. FIG. 13 illustrates a state where contact points between the first fiber 23A and the third fiber 23C are bonded by the second coating layer 234 which is melted and solidified. Although not illustrated, the contact points between the third fibers 23C are bonded by the second coating layer 234.

The second core portion 233 is an organic fiber. Examples of the organic fiber include those similar to the first core portion 231 described above. In the present embodiment, polyethylene terephthalate is applied as the second core portion 233.

The second coating layer 234 is a thermoplastic resin. Examples of the thermoplastic resin include those similar to the first coating layer 232 described above. In the present embodiment, polyethylene is applied as the second coating layer 234.

The second melting point of the second coating layer 234 is higher than the first melting point of the first coating layer 232. The difference between the second melting point and the first melting point is preferably 3° C. or higher, and more preferably 5° C. or higher. As a result, in the cooling step when a soundproof sheet S described later is manufactured, the second coating layer 234 can be easily solidified while the first coating layer 232 is melted.

In addition, the second melting point is preferably approximately 20° C. lower than the melting point of the second core portion 233. As a result, when manufacturing the soundproof sheet S, it is easy to melt the second coating layer 234 without melting the second core portion 233. The melting point of the second coating layer 234 is preferably 110° C. or higher and 210° C. or lower, and more preferably 110° C. or higher and 160° C. or lower.

The average fiber length of the third fiber 23C, that is, the average fiber length of the second core portion 233 is preferably 100 μm or more and 5 mm or less, and more preferably approximately 1 mm. As a result, the plurality of third fibers 23C are likely to be entangled with the plurality of first fibers 23A, and mechanical properties such as the strength of the soundproof sheet S can be improved.

For example, the ratio of the diameter D2 of the second core portion 233 to the thickness E2 of the second coating layer 234 is preferably 0.2 or more and 2.0 or less, and more preferably 0.5 or more and 1.5 or less. As a result, in the heating step when the soundproof sheet S is manufactured, the second coating layer 234 can be melted and solidified while suppressing the deformation of the second core portion 233.

Figure 14:
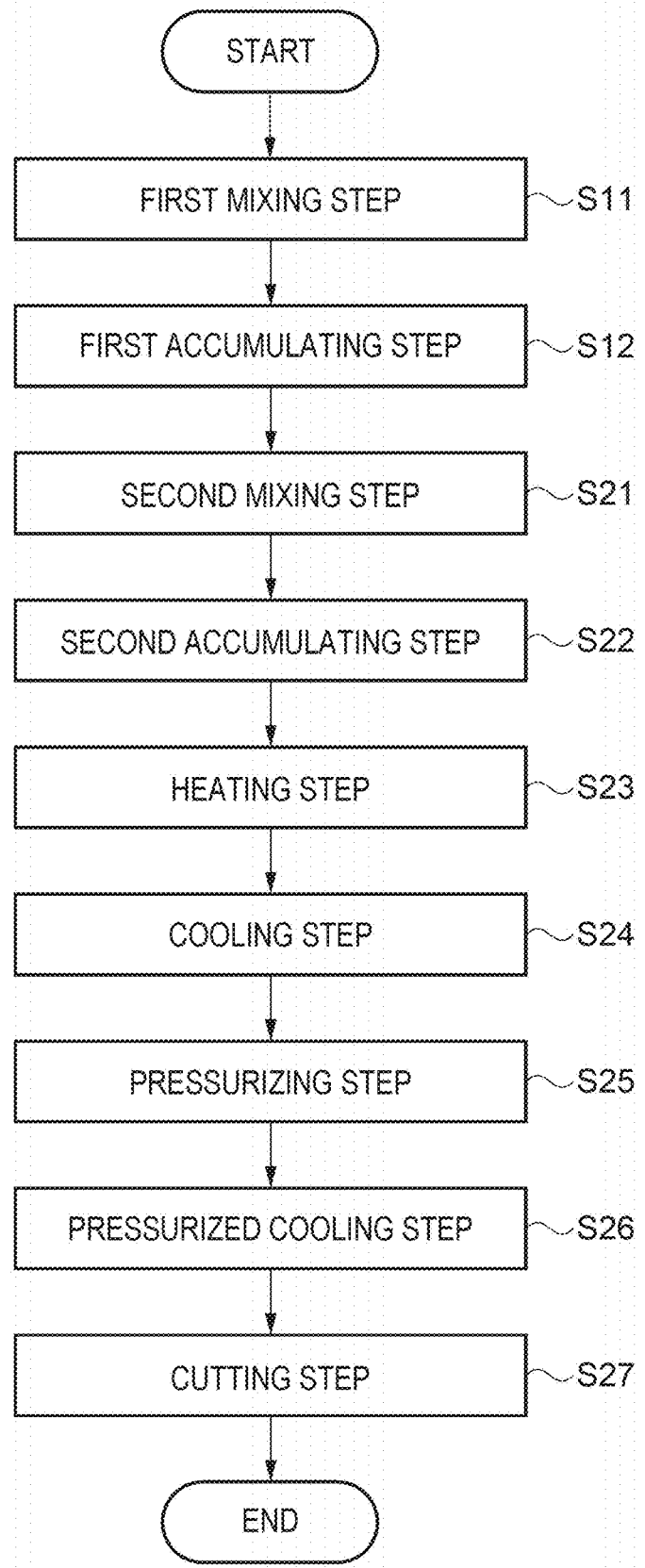
FIG. 14 is a flow chart illustrating a method of manufacturing a soundproof sheet.

As illustrated in FIG. 14, the method of manufacturing a soundproof sheet S according to the present embodiment includes a first mixing step S11 and a first accumulating step S12 for producing a web W1 and a second mixing step S21 and a second accumulating step S22 for producing a web W2. In addition, the method of manufacturing a soundproof sheet S includes a heating step S23, a cooling step S24, a pressurizing step S25, a pressurized cooling step S26, and a cutting step S27, as a post-step after producing the web W1 and the web W2. The method of manufacturing a soundproof sheet S is not limited to the above configuration.

The first mixing step S11 and the first accumulating step S12 are performed in the same manner as in the first embodiment. In the present embodiment, the first mixing step S11 and the first accumulating step S12 of the post-step are performed to produce the web W1, and in parallel with these steps or after these steps, the second mixing step S21 and the second accumulating step S22 of the post-step are performed to produce the web W2.

In the manufacturing apparatus 10 described above, the web W1 may be wound in a roll shape in front of the heating portion 140, and may skip from the heating portion 140 and the pressurized cooling portion 160 and be processed into a single form-shaped web W1 by the cutting portion 170.

The second mixing step S21 is performed in the mixing portion 11. The second mixing step S21 is performed in the same manner as the first mixing step S11 except that the second fiber 23B in the first mixing step S11 is replaced with the third fiber 23C. In the second mixing step S21, a second mixture in which the plurality of first fibers 23A and the plurality of third fibers 23C are mixed is produced.

The second mixture is the web W2 which is a second accumulated fiber body in the accumulating portion 100. In the web W2, the content of the third fiber 23C to the content of the first fiber 23A is preferably 12.0% by mass or more and 40.0% by mass or less, and more preferably 14.0% by mass or more and 25.0% by mass or less. As a result, mechanical properties such as the strength of the soundproof sheet S can be improved while suppressing the content of the second coating layer 234 of the third fiber 23C.

The third fiber 23C is supplied to the hopper 14 after being produced by a separate known device. In addition, a heat kneader or the like may be disposed upstream of the hopper 14 to supply the third fiber 23C produced by the heat kneader to the hopper 14. In the heat kneader, the second coating layer 234 is formed on the second core portion 233.

As the second core portion 233 of the third fiber 23C, a fiber produced by subjecting waste paper, waste cloth, or the like to a defibrating treatment may be used. In addition, an additive may be supplied from any of the hoppers 13 and 14 and contained in the web W2. Examples of the additive include a colorant, a flame retardant, an insect repellent, an antifungal agent, an antioxidant, an ultraviolet absorber, an aggregation inhibitor, and a mold release agent.

The first fiber 23A, the third fiber 23C, and the like are mixed while being transported to the accumulating portion 100 in the main body portion 60 to form a second mixture. The second mixture is transported to the accumulating portion 100 via the main body portion 60 by a blower or the like. The step proceeds to the second accumulating step S22.

The second accumulating step S22 is performed in the accumulating portion 100. The accumulating portion 100 accumulates the second mixture in the air to produce a web W2 in which the plurality of first fibers 23A and the plurality of third fibers 23C are mixed. The accumulating portion 100 takes in the second mixture from the main body portion 60 into the inside of the drum portion 101 and accumulates the second mixture on the mesh belt 122 by a dry method. The second accumulating step S22 is performed in the same manner as the first accumulating step S12, except that the web W2 is produced from the second mixture.

Similar to the web W1, the produced web W2 may be wound in a roll shape as it is in a continuous form shape, or may be formed into a single form by the cutting portion 170 or the like. The main surfaces of the web W2 and the web W1 are matched to be stacked with each other. Instead of producing the web W2 on the mesh belt 122, the web W2 may be produced on the upper surface of the web W1 to save the trouble of stacking both webs. In this case, a mechanism for feeding the continuous form-shaped web W1 onto the mesh belt 122 may be disposed upstream the web transport portion 120. The step proceeds to the heating step S23.

Figure 15:
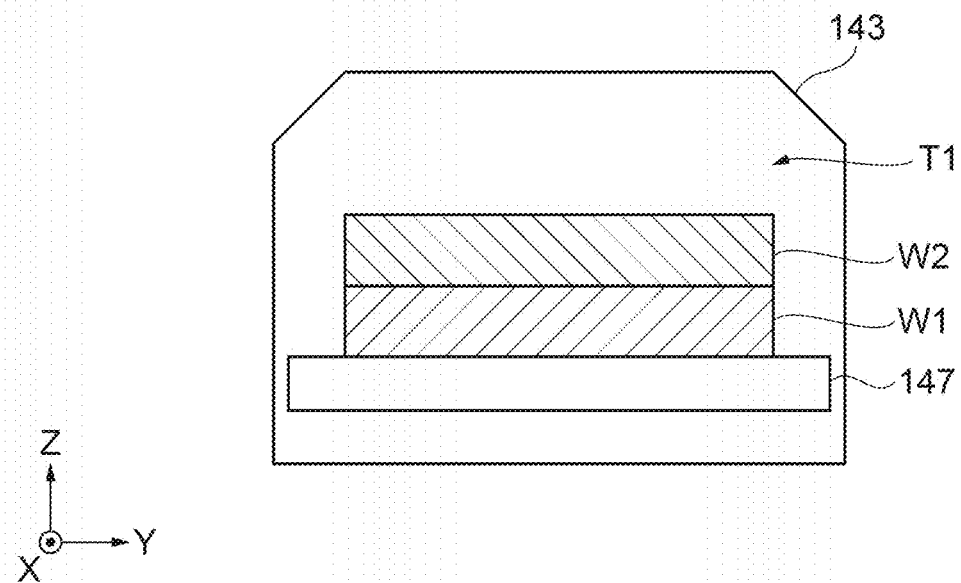
FIG. 15 is a schematic diagram illustrating a method of manufacturing a soundproof sheet.

The heating step S23 is performed using the heating portion 140. As illustrated in FIG. 15, in the heating step S23, the web W1 and the web W2 are stacked and heated in the heat radiating portion 143 to melt the first coating layer 232 and the second coating layer 234. The heating temperature T1 of the web W1 and the web W2 is set to be the second melting point or higher of the second coating layer 234. Other than these, the heating step S13 of the first embodiment is performed in the same manner. The step proceeds to the cooling step S24.

Figure 16:
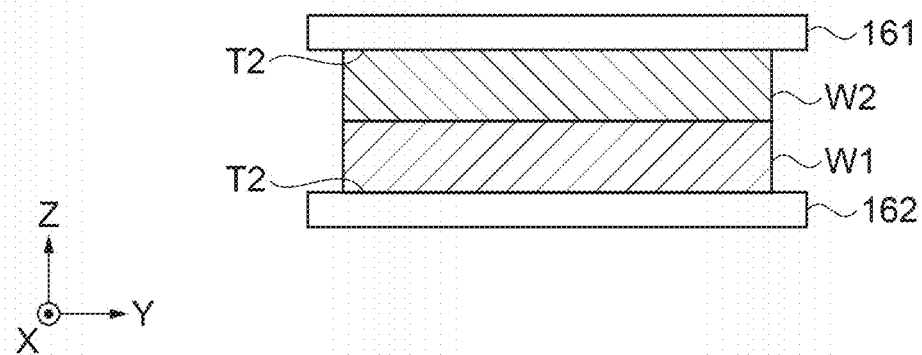
FIG. 16 is a schematic diagram illustrating a method of manufacturing a soundproof sheet.

The cooling step S24 is performed using the pressurized cooling portion 160. As illustrated in FIG. 16, the stacked web W1 and web W2 are cooled to a cooling temperature T2 which is a temperature equal to or higher than the first melting point and lower than the second melting point. As a result, the first coating layer 232 is not solidified and the second coating layer 234 is solidified.

Specifically, the web W1 and the web W2 are interposed between the first pressurized cooling portion 161 and the second pressurized cooling portion 162. At this time, the lower surface of the first pressurized cooling portion 161 is brought into contact with the upper surface of the web W2, and the upper surface of the second pressurized cooling portion 162 is brought into contact with the lower surface of the web W1. The first pressurized cooling portion 161 and the web W2, and the second pressurized cooling portion 162 and the web W1 are only in contact with each other, and no compressive force is applied. The heat of the web W2 propagates to the first pressurized cooling portion 161 and the heat of the web W1 propagates to the second pressurized cooling portion 162 to cool the web W1 and the web W2.

The web W1 and the web W2 are cooled to a cooling temperature T2, the second coating layer 234 is solidified while the first coating layer 232 is still melted, and the step proceeds to the pressurizing step S25 of the next step. As a result, the binding of the contact points between the first fiber 23A and the third fiber 23C and the contact points between the third fibers 23C described above proceeds. In the cooling step S24, in order to maintain the molten state of the first coating layer 232, the cooling device of the second pressurized cooling portion 162 may not be operated. The step proceeds to the pressurizing step S25.

Figure 17:
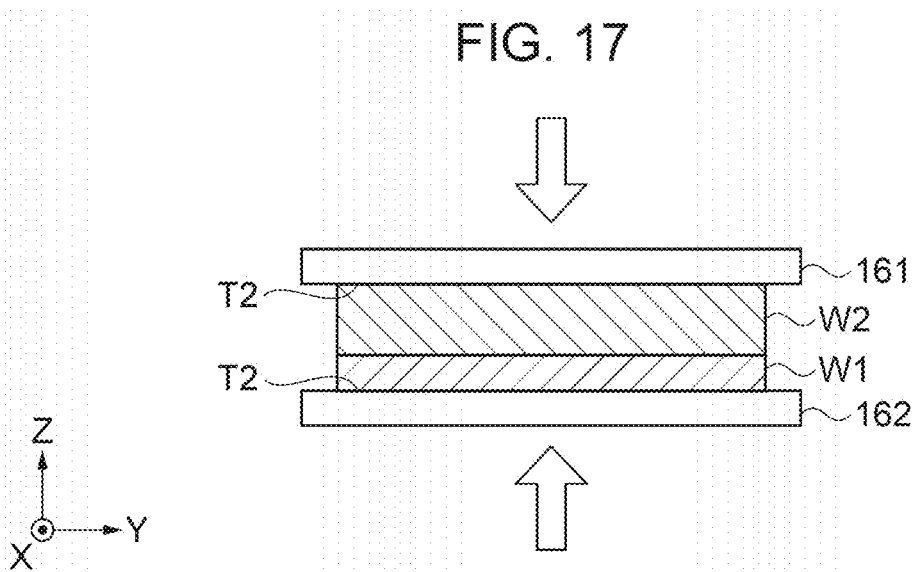
FIG. 17 is a schematic diagram illustrating a method of manufacturing a soundproof sheet.

The pressurizing step S25 is also performed using the pressurized cooling portion 160. As illustrated in FIG. 17, the web W1 and the web W2 are stacked, and a predetermined compressive force is applied to the web W1 in which the first coating layer 232 is still melted and the web W2 in which the second coating layer 234 is solidified. Specifically, the web W1 and the web W2 are compressed by reducing the distance between the first pressurized cooling portion 161 and the second pressurized cooling portion 162 along the Z axis.

At this time, since the first coating layer 232 is in a molten state, bonding of the contact points between the first fiber 23A and the second fiber 23B and the contact points between the second fibers 23B is unlikely to proceed. Therefore, the mechanical strength of the web W1 is low, and the web W1 is compressed in the vertical direction by the applied compressive force to obtain an internal structure having a relatively high density.

On the other hand, since the solidification of the second coating layer 234 proceeds, the contact points between the first fiber 23A and the third fiber 23C and the contact points between the third fibers 23C are bonded. Therefore, the mechanical strength of the web W2 is high, and the web W2 is unlikely to be compressed in the vertical direction by the applied compressive force to obtain an internal structure having a relatively low density.

The compression ratios of the thicknesses of the web W1 and the web W2 in the vertical direction by the predetermined compressive force are preferably 10% or more in total. As a result, since the density of the web W1 is increased, the soundproofing property can be improved. The step proceeds to the pressurized cooling step S26.

Figure 18:
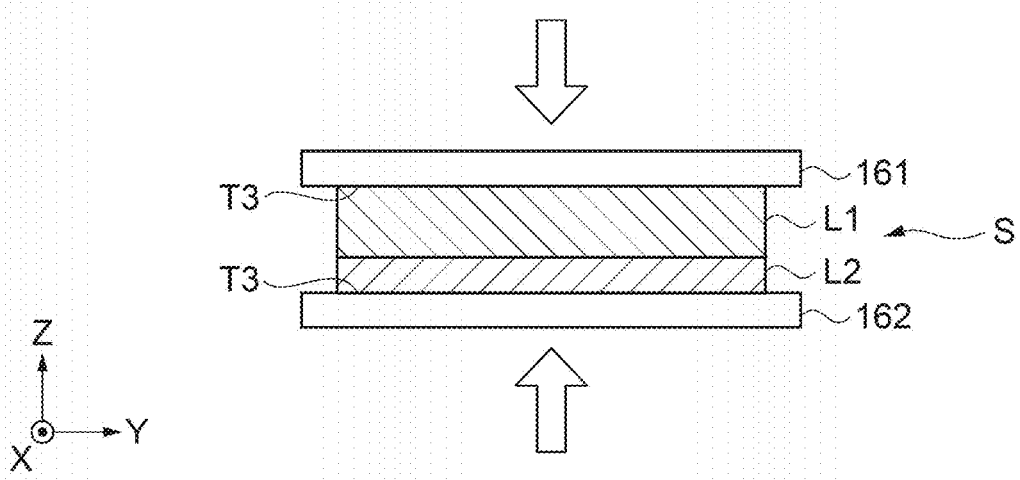
FIG. 18 is a schematic diagram illustrating a method of manufacturing a soundproof sheet.

The pressurized cooling step S26 is also performed using the pressurized cooling portion 160. As illustrated in FIG. 18, in the pressurized cooling step S26, the web W1 and the web W2 are cooled to a cooling temperature T3 while still applying the predetermined compressive force in the pressurizing step S25. That is, the application of compressive force and cooling are performed between the first pressurized cooling portion 161 and the second pressurized cooling portion 162. The cooling temperature T3 of the web W1 and the web W2 in the pressurized cooling step S26 is set to a temperature lower than the first melting point of the first coating layer 232.

As a result, the first coating layer 232 is in a solidified state in addition to the second coating layer 234, and the contact points between the first fiber 23A and the second fiber 23B and the contact points between the second fibers 23B are bonded by the solidified first coating layer 232. The soundproof sheet S includes a relatively high density region L2 derived from the web W1 and a relatively low density region L1 derived from the web W1. The step proceeds to the cutting step S27.

The cutting step S27 is performed using the cutting portion 170. The soundproof sheet S may be wound as it is in a continuous form shape without performing the cutting step S27. As described above, the soundproof sheet S of the present embodiment is manufactured.

Figure 19:
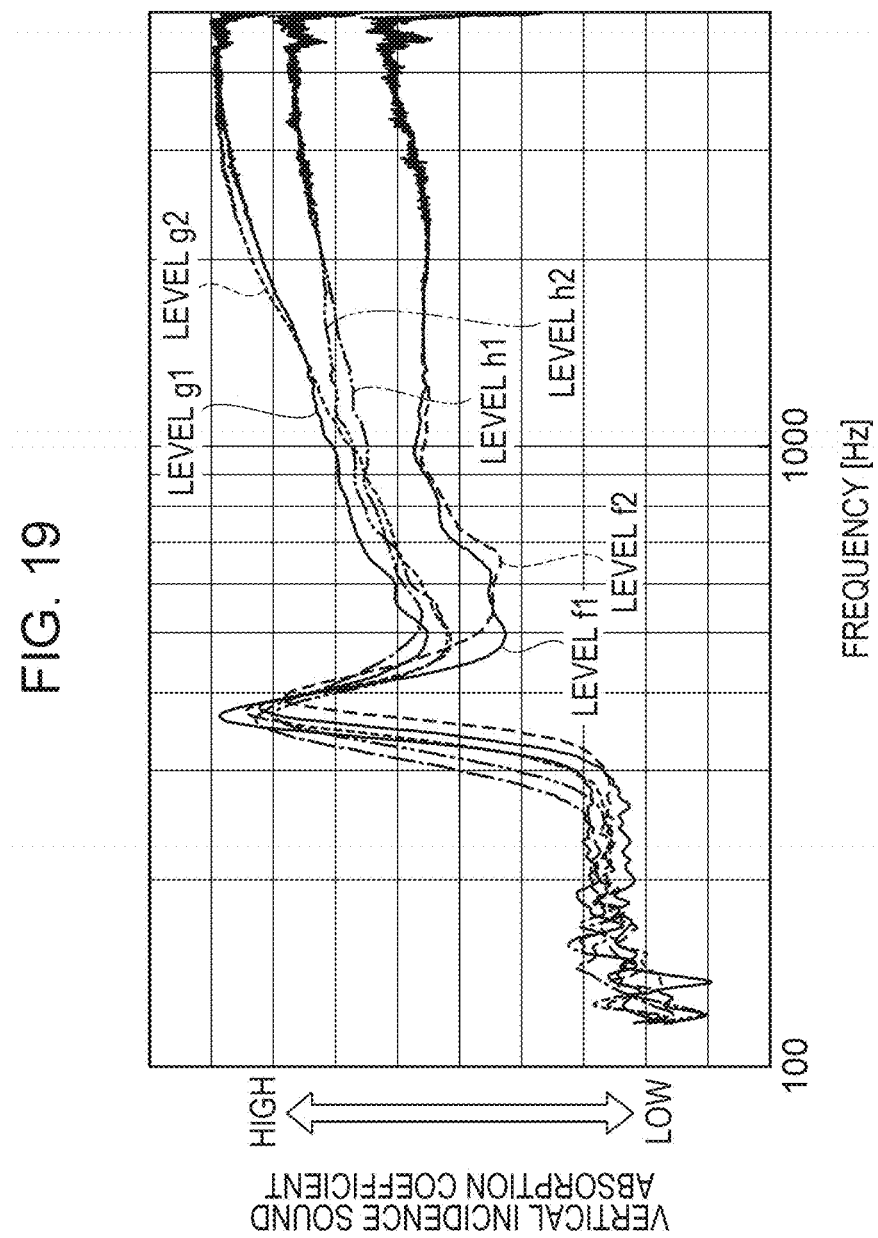
FIG. 19 is a graph illustrating sound absorption characteristics due to an internal structure of the soundproof sheet.

Here, sound absorption characteristics among the soundproof characteristics will be described in the soundproof sheet S including the low density region L1, the high density region L2, and the intermediate density region in the internal structure. FIG. 19 illustrates a change in the sound absorption coefficient of the soundproof sheet S when the sound wave is vertically incident on one main surface of the sample in which the dispositions of the above three regions are changed while changing the frequency "Hz". In FIG. 19, the horizontal axis represents the frequency "Hz" of the sound wave, and the vertical axis represents the sound absorption coefficient of the incident sound waves, that is, the vertical incidence sound absorption coefficient. The sound absorption coefficient is one index of the sound absorption characteristics, and the larger the value, the better the sound absorption characteristics.

The above-described region having the intermediate density can be formed by a unit for shortening the time for performing the cooling step S24, and proceeding to the pressurizing step S25 without completing the solidification of the second coating layer 234, a unit for reducing the applied compressive force, or the like.

In each sample, three soundproof sheets S having different densities are stacked one by one. A sheet H having a density of 0.15 g/cm³ is used as the high density region L2, a sheet L having a density of 0.05 g/cm³ is used as the low density region L1, and a sheet M having a density of 0.10 g/cm³ is used as the intermediate density region. Each of the sheets H, L, and M has a thickness of 20 mm.

Levels g1 and g2 are samples in which the sheet L is disposed on a surface on which sound is incident, and the sheets H and M are disposed behind the sheet L. Levels h1 and h2 are samples in which the sheet M is disposed on a surface on which sound is incident, and the sheets L and H are disposed behind the sheet M. Levels f1 and f2 are samples in which the sheet H is disposed on a surface on which sound is incident, and the sheets L and M are disposed behind the sheet H.

As illustrated in FIG. 19, in a range of approximately 500 Hz to 4000 Hz, differences in the sound absorption characteristics appear at each level. In the above range, with respect to the levels f1 and f2, the sound absorption characteristics are improved at the levels h1 and h2, and the sound absorption characteristics are further excellent at the levels g1 and g2. That is, in general, it was found that the lower the density of the surface on which the sound wave is incident, the better the sound absorption characteristics. Therefore, in consideration of the relationship between the density and the sound insulation characteristics described above, when the low density region L1 is disposed on the incident side of the sound wave and the high density region L2 is disposed on the emission side of the sound wave, the sound absorption characteristics and the sound insulation characteristics can be improved.

Therefore, for example, when used for an outer wall of a house or the like, by disposing the low density region L1 on the indoor side, it is possible to absorb the sound generated in the room. In addition, by disposing the high density region L2 on the outdoor side, it is possible to shield outdoor noise and the like.

According to the present embodiment, it is possible to obtain the following effects.

The internal structure of the soundproof sheet S can be easily controlled. Specifically, by performing the pressurizing step S25 in a state where the first coating layer 232 is melted and the second coating layer 234 is solidified, in the web W1, compression due to pressurization is likely to proceed, and the internal structure has a relatively high density. On the other hand, in the web W2, compression due to pressurization is unlikely to proceed, and the internal structure has a relatively low density. As a result, in the soundproof sheet S, the high density region L2 and the low density region L1 can be easily formed. That is, it is possible to provide a method of manufacturing a soundproof sheet S in which the internal structure is easily controlled, and a soundproof sheet S manufactured by the method of manufacturing.

3. Third Embodiment

The soundproof sheet S according to the present embodiment is manufactured by a method of manufacturing a soundproof sheet S according to the present embodiment, which will be described later. The soundproof sheet S of the present embodiment has an internal structure in which a relatively low density region L1 derived from the web W2 is interposed between relatively high density region L2 derived from the web W1. That is, the soundproof sheet S of the present embodiment is different from the soundproof sheet S of the second embodiment in that the soundproof sheet S is manufactured from two webs W1 and one web W2.

Hereinafter, the description of the configuration overlapping with the above-described embodiment will be omitted. The manufacturing apparatus 10 described above is also used in the method of manufacturing a soundproof sheet S of the present embodiment. In the following description, FIG. 5 of the first embodiment and FIG. 14 of the second embodiment will also be referred to.

Figure 20:
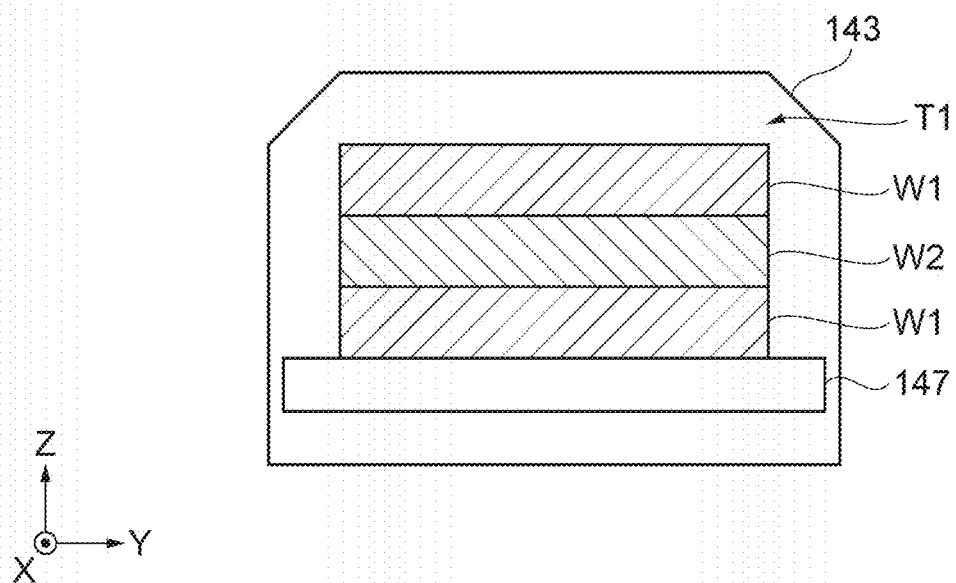
FIG. 20 is a schematic diagram illustrating a method of manufacturing a soundproof sheet according to a third embodiment.

The web W1 and the web W2 are produced in the same manner as in the above embodiment, and the step proceeds to the heating step S23. In the heating step S23, as illustrated in FIG. 20, the web W1, the web W2, and the web W1 are stacked and heated in this order in the vertical direction in the heat radiating portion 143 to melt the first coating layer 232 and the second coating layer 234. The heating temperature T1 of the web W1 and the web W2 is set to be the second melting point or higher of the second coating layer 234. Other than these, the heating step S13 of the first embodiment is performed in the same manner. The step proceeds to the cooling step S24.

Figure 21:
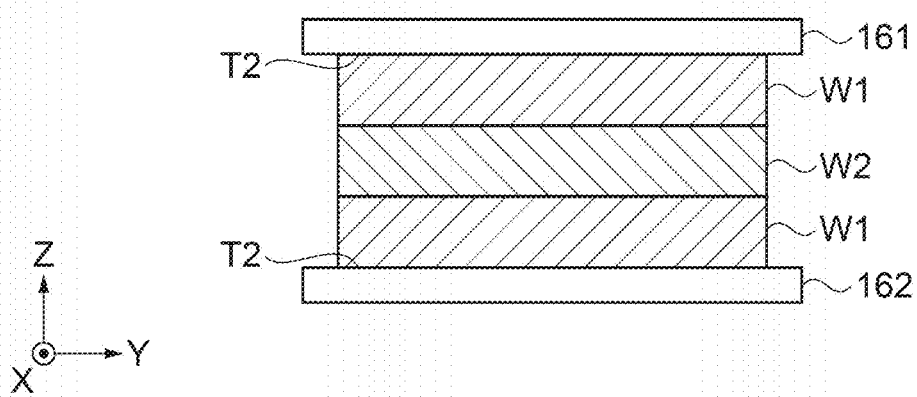
FIG. 21 is a schematic diagram illustrating a method of manufacturing a soundproof sheet.

In the cooling step S24, as illustrated in FIG. 21, the two stacked webs W1 and one web W2 are cooled to a cooling temperature T2 which is a temperature equal to or higher than the first melting point and lower than the second melting point. As a result, the first coating layer 232 is not solidified and the second coating layer 234 is solidified. The step proceeds to the pressurizing step S25.

Figure 22:
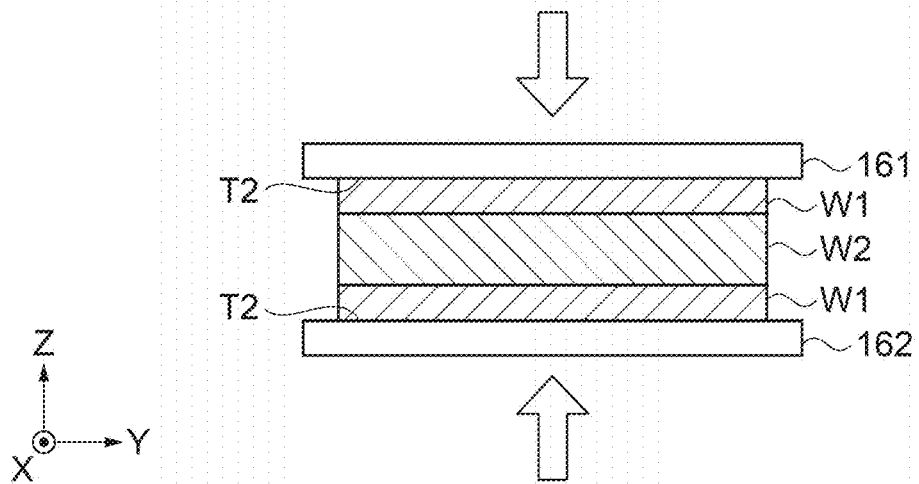
FIG. 22 is a schematic diagram illustrating a method of manufacturing a soundproof sheet.

In the pressurizing step S25, as illustrated in FIG. 22, a predetermined compressive force is applied to the two webs W1 in which the first coating layer 232 is still melted and one web W2 in which the second coating layer 234 is solidified. As a result, the web W1 has an internal structure having a relatively high density, and the web W2 has an internal structure having a relatively low density. The step proceeds to the pressurized cooling step S26.

Figure 23:
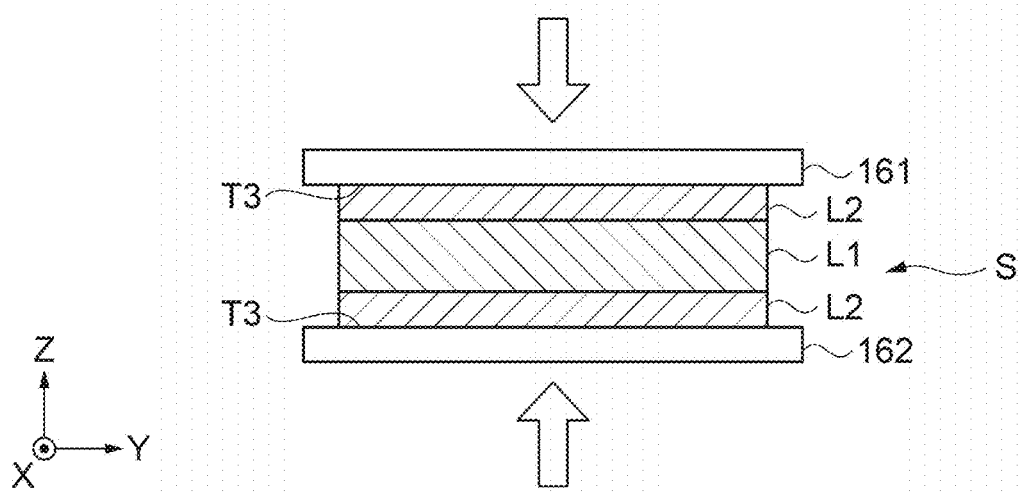
FIG. 23 is a schematic diagram illustrating a method of manufacturing a soundproof sheet.

In the pressurized cooling step S26, as illustrated in FIG. 23, the two webs W1 and the web W2 are cooled to a cooling temperature T3 while still applying the predetermined compressive force in the pressurizing step S25. The cooling temperature T3 in the pressurized cooling step S26 is set to a temperature lower than the first melting point of the first coating layer 232.

As a result, in addition to the second coating layer 234, the first coating layer 232 is also in a solidified state. Therefore, the soundproof sheet S is formed that includes a relatively high density region L2 derived from the web W1 and a relatively low density region L1 derived from the web W2. The soundproof sheet S may be appropriately cut by the cutting step S27.

According to the present embodiment, in addition to the effects of the above-described embodiment, a three-layer structure can be easily formed.

4. Fourth Embodiment

The soundproof sheet S according to the present embodiment is manufactured by a method of manufacturing a soundproof sheet S according to the present embodiment, which will be described later. The soundproof sheet S of the present embodiment is different from the soundproof sheet S of the first embodiment in that an internal structure including a relatively low density region L1 and a relatively high density region L2 is formed from one web W1. Hereinafter, the description of the configuration overlapping with the above-described embodiment will be omitted. The manufacturing apparatus 10 described above is also used in the method of manufacturing a soundproof sheet S of the present embodiment. In the following description, FIGS. 4 and 5 of the first embodiment will also be referred to.

Figure 24:
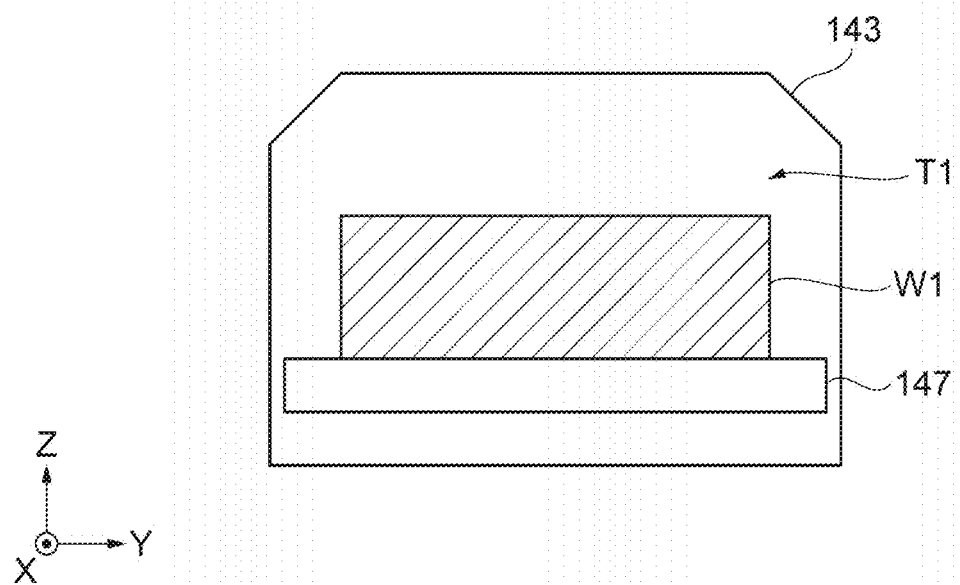
FIG. 24 is a schematic diagram illustrating a method of manufacturing a soundproof sheet according to a fourth embodiment.

The web W1 is produced in the same manner as in the first embodiment, and the step proceeds to the heating step S13. In the heating step S13, as illustrated in FIG. 24, the web W1 is heated by the heat radiating portion 143 to melt the first coating layer 232. The heating temperature T1 of the web W1 is set to be equal to or higher than the first melting point of the first coating layer 232. The step proceeds to the cooling step S14.

Figure 25:
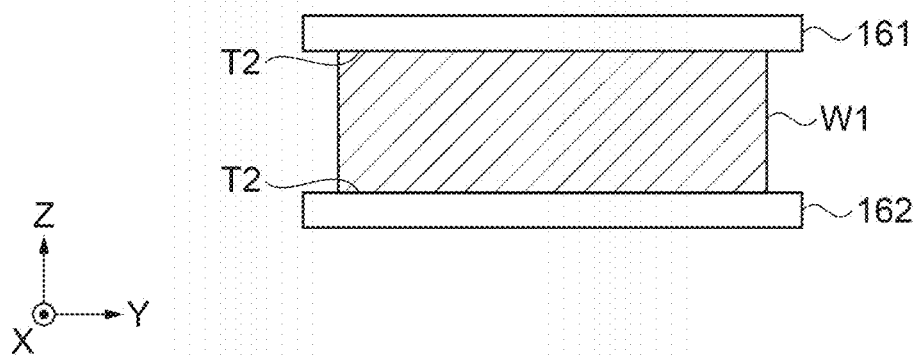
FIG. 25 is a schematic diagram illustrating a method of manufacturing a soundproof sheet.

In the cooling step S14, as illustrated in FIG. 25, the web W1 is cooled to a cooling temperature T2 which is a temperature lower than the first melting point. At this time, a region having a temperature lower than the first melting point and a region having a temperature equal to or higher than the first melting point remain in the web W1. That is, a region where the first coating layer 232 is solidified and is relatively close, and a region where the first coating layer 232 is melted and is relatively far away with respect to the first pressurized cooling portion 161 and the second pressurized cooling portion 162 are mixed. Therefore, the step proceeds to the pressurizing step S15 before the internal temperature of the web W1 uniformly drops to the cooling temperature T2.

Figure 26:
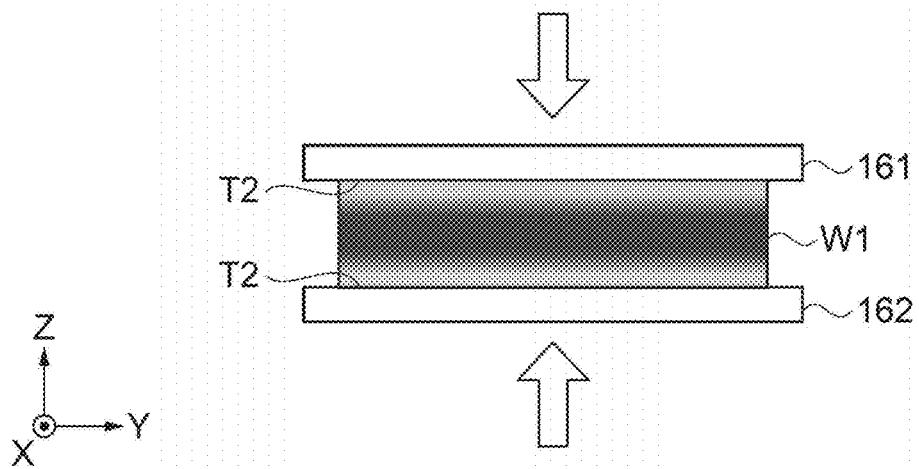
FIG. 26 is a schematic diagram illustrating a method of manufacturing a soundproof sheet.

In the pressurizing step S15, as illustrated in FIG. 26, a predetermined compressive force is applied to the web W1. As a result, regions having different densities are formed inside the web W1. The step proceeds to the pressurized cooling step S16.

Figure 27:
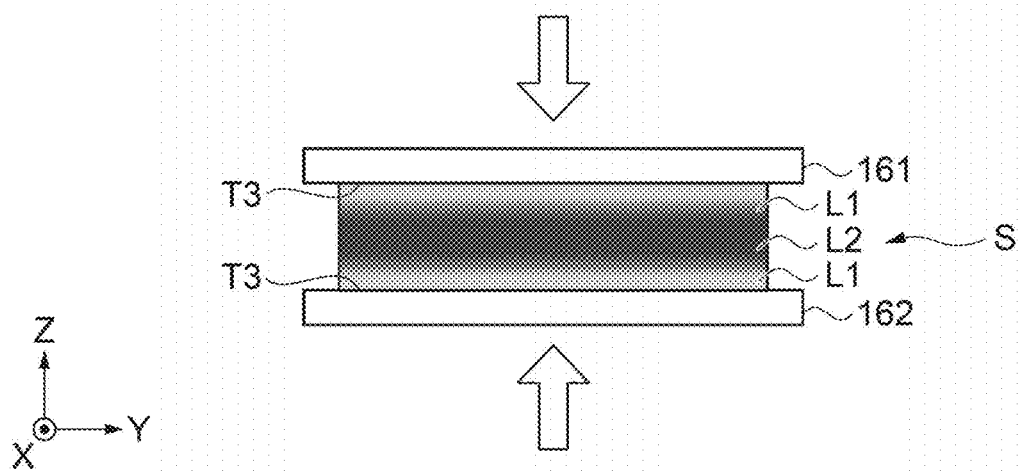
FIG. 27 is a schematic diagram illustrating a method of manufacturing a soundproof sheet.

In the pressurized cooling step S16, as illustrated in FIG. 27, the web W1 is cooled to a cooling temperature T3 while still applying the predetermined compressive force in the pressurizing step S15. The cooling temperature T3 of the web W1 in the pressurized cooling step S16 is set to a temperature lower than the first melting point of the first coating layer 232.

As a result, in the soundproof sheet S, the region having a temperature lower than the first melting point is the relatively low density region L1, and the region having a temperature equal to or higher than the first melting point is the relatively high density region L2.

According to the present embodiment, in addition to the effects of the first embodiment, it is possible to easily form an internal structure having a density gradient in one web W1.

What is claimed is:

1. A method of manufacturing a soundproof sheet comprising:

a first accumulating step of producing a first accumulated fiber body in which a plurality of first fibers, which are natural fibers, and a plurality of second fibers including a first core portion and a first coating layer coating the first core portion and having a first melting point are mixed;

a second accumulating step of producing a second accumulated fiber body in which a plurality of first fibers and a plurality of third fibers including a second core portion and a second coating layer coating the second core portion and having a second melting point higher than the first melting point are mixed;

a heating step of stacking and heating the first accumulated fiber body and the second accumulated fiber body to melt the first coating layer and the second coating layer;

a cooling step of cooling the stacked first accumulated fiber body and second accumulated fiber body to a temperature equal to or higher than the first melting point and lower than the second melting point to solidify the second coating layer without solidifying the first coating layer;

a pressurizing step of applying a predetermined compressive force to the stacked first accumulated fiber body and second accumulated fiber body in which the second coating layer is solidified; and a pressurized cooling step of cooling the first accumulated fiber body and the second accumulated fiber body to a temperature lower than the first melting point to solidify the first coating layer and the second coating layer, while still applying the predetermined compressive force.

2. A method of manufacturing a soundproof sheet comprising:

a first accumulating step of producing a first accumulated fiber body in which a plurality of first fibers, which are natural fibers, and a plurality of second fibers including a first core portion and a first coating layer coating the first core portion and having a first melting point are mixed;

a heating step of heating the first accumulated fiber body to melt the first coating layer;

a pressurizing step of applying a predetermined compressive force to the first accumulated fiber body in a state where the first coating layer is melted; and a pressurized cooling step of cooling the first accumulated fiber body to solidify the first coating layer while still applying the predetermined compressive force, wherein in the pressurizing step, a compression ratio due to the predetermined compressive force is 10% or more, the pressurizing step is performed by using a pressurizing portion, the pressurizing portion includes a first pressurizing portion and a second pressurizing portion, the compressive force is applied between the first pressurizing portion and the second pressurizing portion, the pressurized cooling step is performed using a pressurized cooling portion, the pressurized cooling portion includes a first pressurized cooling portion and a second pressurized cooling portion, and application of the compressive force and cooling are performed between the first pressurized cooling portion and the second pressurized cooling portion.

3. The method of manufacturing the soundproof sheet according to claim 2, wherein the first fiber is a cellulose fiber, an average fiber length of the first fiber is 10 μm or more and 50 mm or less, in the second fiber, the first core portion is polyethylene terephthalate, and the first coating layer is polyethylene, and an average fiber length of the second fiber is 100 μm or more and 5 mm or less.

4. The method of manufacturing the soundproof sheet according to claim 3, wherein in the first accumulated fiber body, a content of the second fiber to a content of the first fiber is 12.0% by mass or more and 40.0% by mass or less.

5. The method of manufacturing the soundproof sheet according to claim 1, wherein the first fiber is a cellulose fiber, an average fiber length of the first fiber is 10 μm or more and 50 mm or less, in the second fiber, the first core portion is polyethylene terephthalate, and the first coating layer is polyethylene, in the third fiber, the second core portion is polyethylene terephthalate, and the second coating layer is polyethylene, and an average fiber length of the second fiber and the third fiber is 100 μm or more and 5 mm or less.

6. The method of manufacturing the soundproof sheet according to claim 5, wherein a difference between the first melting point and the second melting point is 3° C. or higher.

7. The method of manufacturing the soundproof sheet according to claim 6, wherein in the first accumulated fiber body, a content of the second fiber to a content of the first fiber is 12.0% by mass or more and 40.0% by mass or less, and in the second accumulated fiber body, a content of the third fiber to a content of the first fiber is 12.0% by mass or more and 40.0% by mass or less.

8. The method of manufacturing the soundproof sheet according to claim 2, wherein the first pressurizing portion includes a first control portion, the second pressurizing portion includes a second control portion, the first pressurized cooling portion includes a third control portion, the second pressurized cooling portion includes a fourth control portion, and the first control portion, the second control portion, the third control portion, and the fourth control portion are controlled by a fifth control portion.

* * * * *